United States Patent
Scalf

(10) Patent No.: US 6,577,985 B2
(45) Date of Patent: Jun. 10, 2003

(54) SCALABLE CODE ABSOLUTE LOGIC FUNCTION (SCALF) ENCODER

(75) Inventor: Gerald W. Scalf, Houston, TX (US)

(73) Assignee: EIM Company, Inc., Missouri City, TX (US)

( * ) Notice: Subject to any disclaimer, the term of this patent is extended or adjusted under 35 U.S.C. 154(b) by 228 days.

(21) Appl. No.: 09/732,093

(22) Filed: Dec. 7, 2000

(65) Prior Publication Data

US 2002/0111765 A1 Aug. 15, 2002

(51) Int. Cl.[7] .............................................. G01B 7/14
(52) U.S. Cl. ...................................................... 702/163
(58) Field of Search ................................ 702/163, 113; 600/515; 340/623; 455/115

(56) References Cited

U.S. PATENT DOCUMENTS

| | | | |
|---|---|---|---|
| 3,226,711 A | 12/1965 | Lautzenhiser | 340/359 |
| 3,531,798 A | 9/1970 | Bureau | 340/347 |
| 4,193,393 A * | 3/1980 | Schlager | 600/515 |
| 4,427,972 A | 1/1984 | Haville et al. | 340/347 |
| 4,536,762 A * | 8/1985 | Moates | 340/870.02 |
| 4,691,192 A | 9/1987 | Baker | 340/347 |
| 4,697,168 A | 9/1987 | Baker | 340/347 |
| 4,728,950 A | 3/1988 | Hendrickson et al. | 340/870.31 |
| 4,737,710 A | 4/1988 | Van Antwerp et al. | 324/208 |
| 4,774,464 A | 9/1988 | Kubota et al. | 324/208 |
| 4,851,771 A | 7/1989 | Ikeda et al. | 324/208 |
| 4,901,072 A | 2/1990 | Fox | 341/10 |
| 4,942,394 A | 7/1990 | Gasiunas | 340/871.31 |
| 4,990,909 A | 2/1991 | Ueda et al. | 341/15 |
| 5,003,261 A | 3/1991 | Kim | |
| 5,029,304 A | 7/1991 | Tolmie, Jr. | 341/15 |
| 5,038,243 A | 8/1991 | Gordon | 341/2 |
| 5,049,879 A | 9/1991 | Symonds | 341/10 |
| 5,056,049 A * | 10/1991 | O'Neill | 340/623 |
| 5,211,539 A | 5/1993 | McCarty | |
| 5,239,692 A * | 8/1993 | Kim | 455/115 |
| 5,438,330 A * | 8/1995 | Yamazaki et al. | 702/113 |
| 5,457,371 A | 10/1995 | Gordon | 318/661 |
| 5,519,393 A * | 5/1996 | Brandestini | 600/515 |
| 5,544,000 A | 8/1996 | Suzuki et al. | |
| 5,640,007 A | 6/1997 | Talbott et al. | 250/231.15 |
| 5,663,557 A * | 9/1997 | Morita et al. | 250/231.18 |
| 5,668,331 A * | 9/1997 | Schintag et al. | 455/115 |
| 5,739,775 A | 4/1998 | Brandestini | 341/10 |
| 5,880,683 A * | 3/1999 | Brandestini | 340/623 |
| 6,424,928 B1 * | 7/2002 | Elliott et al. | 702/113 |

* cited by examiner

Primary Examiner—John Barlow
Assistant Examiner—Aditya Bhat
(74) Attorney, Agent, or Firm—Vinson & Elkins L.L.P.

(57) ABSTRACT

An inventive encoding system that expects, accepts and interprets both normal and abnormal states of a sensor array, and that preferably further recognizes a zero state as a malfunction. The system is "absolute," in that it allows detection of the best fit detectable position of a movable object with an accuracy equal to the resolution which is equal to one-half the physical displacement of sensors or sources in an array. Such absolute references may be used to define a position detector which properly detects the position of an object after power is applied, even though the object may have moved further after power is removed. As a result, the inventive encoder does not require a battery back-up to detect position accurately after a power failure. This functionality is highly advantageous when detecting shaft position of a multi-turn shaft. The inventive encoding system is also scalable so that there are few limitations in deployment. Truth table logic is employed in a logic function that is designed to implement the foregoing attributes of the inventive encoding system.

34 Claims, 14 Drawing Sheets

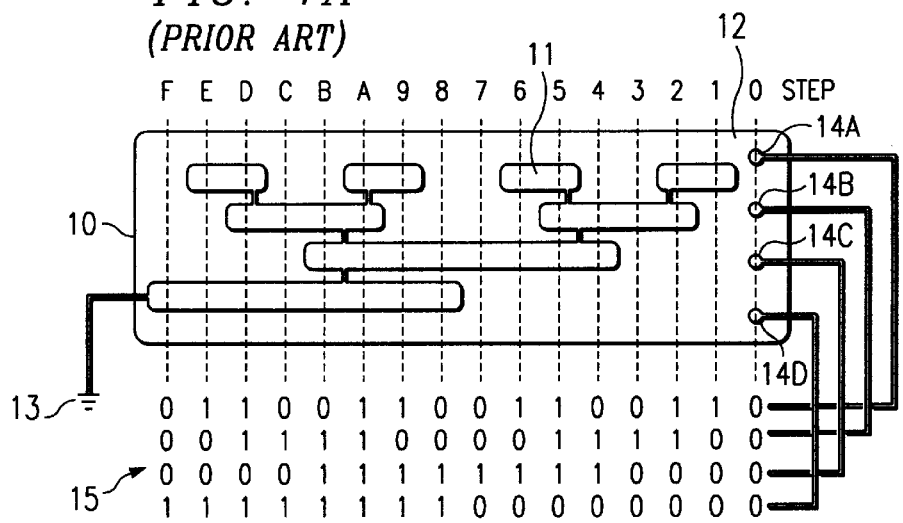
FIG. 1A
(PRIOR ART)
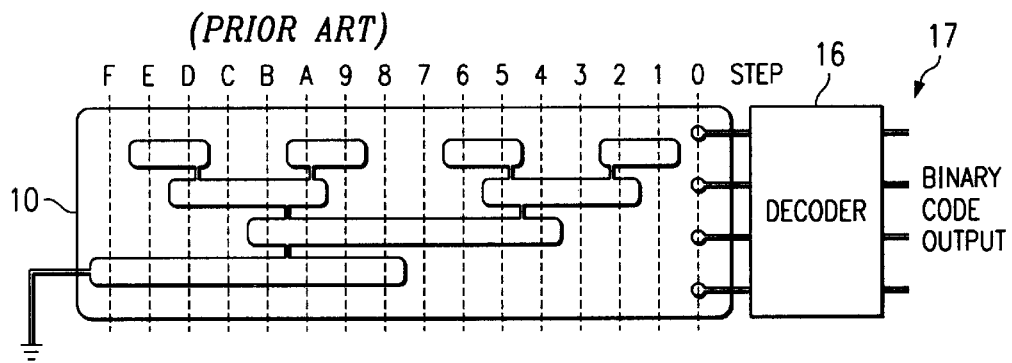
FIG. 1B
(PRIOR ART)
FIG. 1C
(PRIOR ART)
| STEP | GRAY | BINARY |
|---|---|---|
| 0 | 0000 | 0000 |
| 1 | 0001 | 0001 |
| 2 | 0011 | 0010 |
| 3 | 0010 | 0011 |
| 4 | 0011 | 0100 |
| 5 | 0110 | 0101 |
| 6 | 0111 | 0110 |
| 7 | 0101 | 0111 |
| 8 | 0100 | 1000 |
| 9 | 1100 | 1001 |
| A | 1101 | 1010 |
| B | 1111 | 1011 |
| C | 1110 | 1100 |
| D | 1010 | 1101 |
| E | 1011 | 1110 |
| F | 1000 | 1111 |
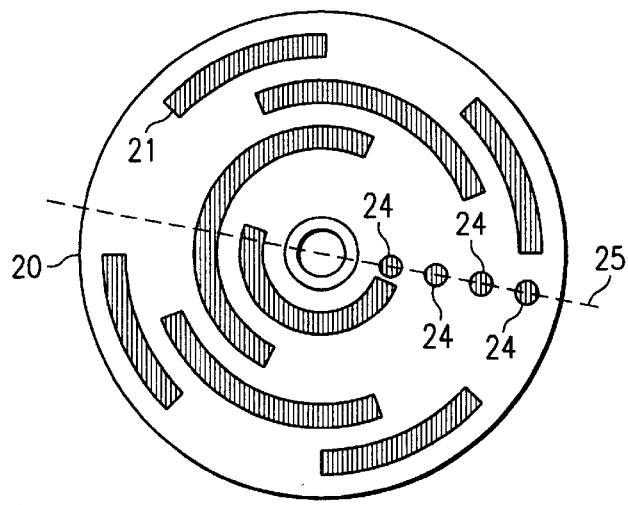
FIG. 2A
(PRIOR ART)

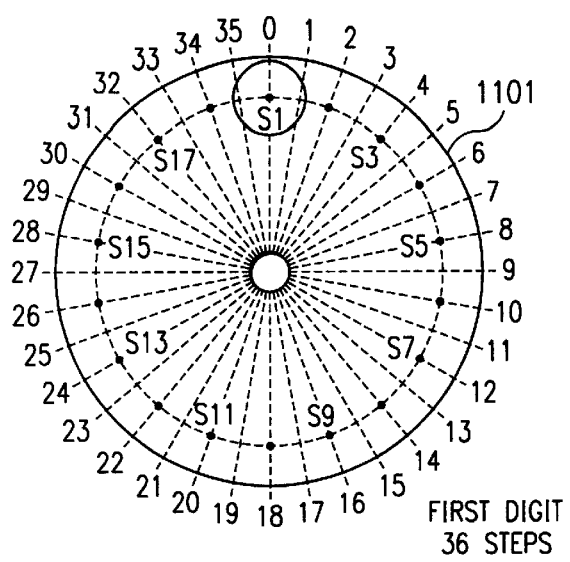
FIRST DIGIT
36 STEPS
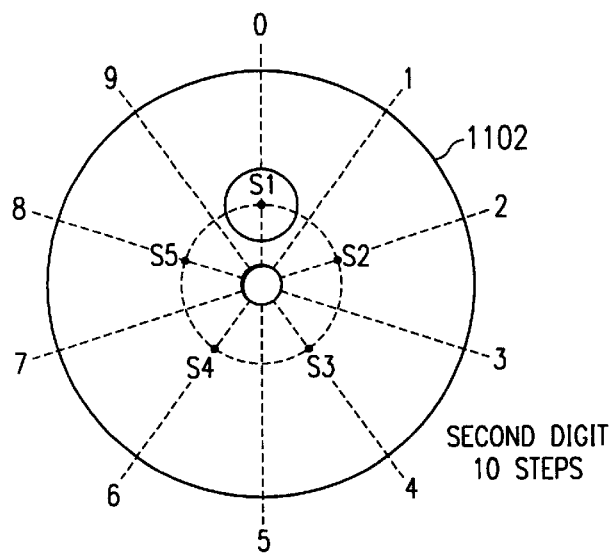
SECOND DIGIT
10 STEPS
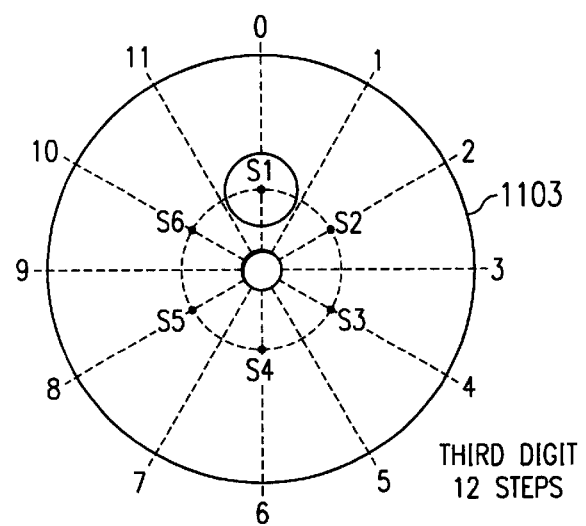
THIRD DIGIT
12 STEPS
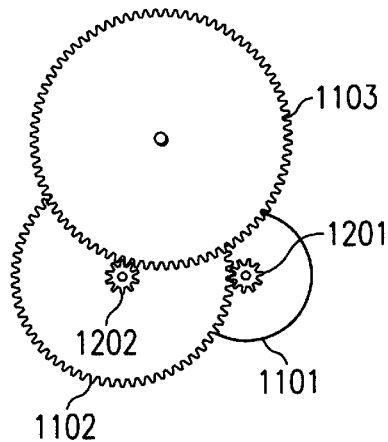
FIG. 13
FIG. 11
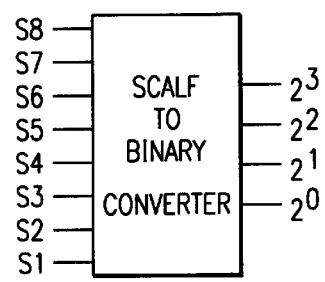
FIG. 15

$B0 = A1 + A2$  $2^0 = B1 \cdot B0'$  $2^1 = B2 \cdot B0'$  $2^2 = B3 \cdot B0'$  $2^3 = B4 \cdot B0'$ B1 = A3+A4+A7+A8+A11+A12+A15+A16+A19+A20+A23+A24+A27+A28+A31+A32
B2 = A5+A6+A7+A8+A13+A14+A15+A16+A21+A22+A23+A24+A29+A30+A31+A32
B3 = A9+A10+A11+A12+A13+A14+A15+A16+A25+A26+A27+A28+A29+A30+A31+A32
B4 = A17+A18+A19+A20+A21+A22+A23+A24+A25+A26+A27+A28+A29+A30+A31+A32

B4'.B3'.B2'.B1'=(S8'.S7'.S6'.S5'.S4'.S3'.S2'.S1)+(S8.S7'.S6'.S5'.S4'.S3'.S2.S1)
B4'.B3'.B2'.B1=(S8'.S7'.S6'.S5'.S4'.S3'.S2.S1)+(S8.S7'.S6'.S5'.S4'.S3.S2.S1)
B4'.B3'.B2.B1'=(S8'.S7'.S6'.S5'.S4'.S3'.S2.S1')+(S8'.S7'.S6'.S5'.S4'.S3.S2.S1)
B4'.B3'.B2.B1=(S8'.S7'.S6'.S5'.S4'.S3.S2.S1')+(S8'.S7'.S6'.S5'.S4.S3.S2.S1)
B4'.B3.B2'.B1'=(S8'.S7'.S6'.S5'.S4'.S3.S2'.S1')+(S8'.S7'.S6'.S5'.S4.S3.S2.S1')
B4'.B3.B2'.B1=(S8'.S7'.S6'.S5'.S4'.S3.S2.S1')+(S8'.S7'.S6'.S5.S4.S3.S2.S1')
B4'.B3.B2.B1'=(S8'.S7'.S6'.S5'.S4.S3'.S2'.S1')+(S8'.S7'.S6'.S5.S4.S3.S2'.S1')
B4'.B3.B2.B1=(S8'.S7'.S6'.S5.S4.S3'.S2'.S1')+(S8'.S7'.S6.S5.S4.S3.S2'.S1')
B4.B3'.B2'.B1'=(S8'.S7'.S6'.S5.S4'.S3'.S2'.S1')+(S8'.S7'.S6.S5.S4.S3'.S2'.S1')
B4.B3'.B2'.B1=(S8'.S7'.S6.S5.S4'.S3'.S2'.S1')+(S8'.S7.S6.S5.S4.S3'.S2'.S1')
B4.B3'.B2.B1'=(S8'.S7'.S6.S5'.S4'.S3'.S2'.S1')+(S8'.S7.S6.S5.S4'.S3'.S2'.S1')
B4.B3'.B2.B1=(S8'.S7.S6.S5'.S4'.S3'.S2'.S1')+(S8.S7.S6.S5.S4'.S3'.S2'.S1')
B4.B3.B2'.B1'=(S8'.S7.S6'.S5'.S4'.S3'.S2'.S1')+(S8.S7.S6.S5'.S4'.S3'.S2'.S1')
B4.B3.B2'.B1=(S8.S7.S6'.S5'.S4'.S3'.S2'.S1)+(S8.S7.S6.S5'.S4'.S3'.S2'.S1)
B4.B3.B2.B1'=(S8.S7'.S6'.S5'.S4'.S3'.S2'.S1')+(S8.S7.S6'.S5'.S4'.S3'.S2'.S1')
B4.B3.B2.B1=(S8.S7'.S6'.S5'.S4'.S3'.S2'.S1)+(S8.S7.S6'.S5'.S4'.S3'.S2.S1)

+ = LOGICAL OR
. = LOGICAL AND
' = NOT (LOW OR OFF OR INVERTED)

$$\text{A1} \quad \text{A2}$$
$$B4'.B3'.B2'.B1' = (S8'.S2'.S1) + (S8.S7'.S3'.S2)$$
$$\text{A3} \quad \text{A4}$$
$$B4'.B3'.B2'.B1 = (S8'.S3'.S2.S1) + (S8.S7'.S4'.S3)$$
$$\text{A5} \quad \text{A6}$$
$$B4'.B3'.B2.B1' = (S3'.S2.S1') + (S8'.S4'.S3.S1)$$
$$\text{A7} \quad \text{A8}$$
$$B4'.B3'.B2.B1 = (S4'.S3.S2.S1') + (S8'.S5'.S4.S1)$$
$$\text{A9} \quad \text{A10}$$
$$B4'.B3.B2'.B1' = (S4'.S3.S2') + (S5'.S4.S2.S1')$$
$$\text{A11} \quad \text{A12}$$
$$B4'.B3.B2'.B1 = (S5'.S4'.S3.S2) + (S6'.S5.S2.S1')$$
$$\text{A13} \quad \text{A14}$$
$$B4'.B3.B2.B1' = (S5'.S4.S3') + (S6'.S5.S3.S2')$$
$$\text{A15} \quad \text{A16}$$
$$B4'.B3.B2.B1 = (S6'.S5.S4.S3') + (S7'.S6.S3.S2')$$
$$\text{A17} \quad \text{A18}$$
$$B4.B3'.B2'.B1' = (S6'.S5.S4') + (S7'.S6.S4.S3')$$
$$\text{A19} \quad \text{A20}$$
$$B4.B3'.B2'.B1 = (S7'.S6.S5.S4') + (S8'.S7.S4.S3')$$
$$\text{A21} \quad \text{A22}$$
$$B4.B3'.B2.B1' = (S7'.S6.S5') + (S8'.S7.S5.S4')$$
$$\text{A23} \quad \text{A24}$$
$$B4.B3'.B2.B1 = (S8'.S7.S6.S5') + (S8.S5.S4'.S1')$$
$$\text{A25} \quad \text{A26}$$
$$B4.B3.B2'.B1' = (S8'.S7.S6') + (S8.S6.S5'.S1')$$
$$\text{A27} \quad \text{A28}$$
$$B4.B3.B2'.B1 = (S8.S7.S6'.S1') + (S6.S5'.S2'.S1')$$
$$\text{A29} \quad \text{A30}$$
$$B4.B3.B2.B1' = (S8.S7'.S1') + (S7.S6'.S2'.S1')$$
$$\text{A31} \quad \text{A32}$$
$$B4.B3.B2.B1 = (S8.S7'.S2'.S1) + (S7.S6'.S3'.S2)$$

SCALABLE CODE ABSOLUTE LOGIC FUNCTION (SCALF) ENCODER

TECHNICAL FIELD OF THE INVENTION

This application relates generally to encoding systems using truth table logic, and in particular to encoding of, for example, detected array states into a digital representation having improved reliability and predictability.

BACKGROUND OF THE INVENTION

The present invention includes a sensor array encoding system that is specifically designed for implementation on the absolute position detector described in commonly-assigned, co-pending U.S. patent application "ABSOLUTE POSITION DETECTOR INTERPRETING ABNORMAL STATES," Ser. No. 09/595,368, filed Jun. 15, 2000 (hereafter "APD interpreting Abnormal States"). It will be appreciated, however, that the inventive encoding system disclosed herein is much broader in concept, and is in no way limited to a specific implementation such as is described in APD interpreting Abnormal States. The inventive encoding system has many other applications, including in encoding other suitable sensor array implementations in which abnormal states are accepted rather than rejected.

Encoding systems, such as Binary code or Gray code, for example, are known in the art. FIG. 1A illustrates a conventional linear electrical contact encoder using Gray code. Encoder plate 10 has a conductive encoding pattern 11 equivalent to Gray code etched or clad to an insulating material 12. The conductive pattern is normally connected to the power supply ground 13 while a positive current is applied to each of the contact brushes or pins 14A through 14D. As the encoder plate 10 or the contact pins 14A through 14D are moved, if any one pin 14 contacts a conductive area 11 of the plate 10, a one (low true) output is generated in the output truth table 15. While a pin 14A through 14D is contacting the insulating portion 12 of the plate 10, a zero output is generated in the output table 15. The four contact pins 14A through 14D and the encoding plate 10 as illustrated on FIG. 1A will be understood to generate sixteen distinct codes for each of the sixteen steps as shown in the truth table 15.

Referring now to FIG. 1B, Gray code, as with most other conventional encoder codes, must then be decoded into a code recognizable by computers or other devices such as a displays or printers. Since computers are based on the binary numbering system, a conversion to binary code is usually the most logical. Encoded data (Gray code) from the encoder is input to the decoder 16 and the outputs of the decoder is binary code 17 as shown in the truth tables 18 of FIG. 1C. It will be understood on FIG. 1C that exemplary use is made of four bits of binary code represented by four bits of Gray code to encode the sixteen steps (notated in hexadecimal) in the encoder depicted in FIG. 1A. This exemplary use of four-bit binary code relating to a hexadecimal number of steps will be continued, although it will be understood that the conventional encoding and decoding principles described with reference to FIGS. 1A through 1C may be scaled larger or smaller.

Referring now to FIG. 2A, it is also known in the art that the linear encoding pattern 11 as shown on FIG. 1A may be represented as a circular pattern 21 on endless loop encoder disk 20. The contact pins 24 are shown at the datum zero position 25 with the least significant bit (LSB) at the outer edge and the most significant bit (MSB) at the enter-most ring of the disk. This encoded disk will produce the same Gray code as shown in the truth table 15 of FIG. 1A and may be decoded to binary using a decoder 16 as depicted in FIG. 1B to yield the truth tables 18 of FIG. 1C.

Although useful to illustrate a principle, electrical contact encoders are seldom used in today's industrial applications due to numerous performance-related problems. These types of encoders have a finite life due to mechanical wear between the contact plates and brushes or pins. Reliability of a contact device is affected by possible contamination and corrosion which could isolate a contact area. Design and construction require extremely tight tolerances to prevent ambiguous states as discussed below. Some materials used in construction of a contact encoder can generate piezoelectric noise under shock or vibration.

Further, encoders such as illustrated on FIGS. 1A and 2A can generate invalid codes resulting from ambiguous states when an unwanted contact is made or is not made relative to another contact. For example, the end of a conductive plate, whether rotary or linear, is often a site of premature mechanical wear. This wear generates imprecise contact. Moreover, rotary encoder devices such as illustrated in FIG. 2A are particularly prone to this problem with ambiguous states. FIG. 2B shows an area 26 likely to be affected by ambiguous states resulting from an ambiguous contact position. The problem is amplified in multi-turn shaft encoders deployed as geared disks in a hierarchical relationship, where the gears produce a cumulative error from the least significant digit to the most significant.

By examining an example of a conventional multi-turn encoder 27 depicted in FIG. 2C, the problem will become more apparent. The multi-turn encoder 27 has four encoder disks A through D, each comprising large gears 28A through 28D, and further comprising encoding patterns 21 analogous to those depicted on FIGS. 2A and 2B (encoding patterns not illustrated on FIG. 2C). Large gears 28A through 28D mesh with small gears 29A through 29D. The ratio between large gears 28A through 28D and small gears 29A through 29D is a function of desired multiplication (M). Since computers use binary code, it is generally preferable to user a binary number as the multiplier. Using an exemplary value of 16 (or $2^4$) for M, each large gear 28A through 28D needs to have 16×N teeth, where N is the number of teeth on each small gear 29A through 29D. Using an exemplary value of 8 (or $2^3$) for N, then each large gear 28A through 28D has 16×8=128 teeth. Now, with a gear ratio of 16:1 it will be understood that second encoder disk B turns one revolution for each sixteen revolutions of the first encoder disk A, and so on. Thus fourth encoder disk D turns one revolution for each 4096 revolutions of the first encoder disk A. Giving each encoder disk A through D on FIG. 2C an encoding pattern identical to the encoding pattern 21 depicted on FIGS. 2A and 2B, each encoder disk A through D monitors for 16 steps 0 through F (as notated in hexadecimal). The total number of steps capable of being monitored by multi-turn encoder 27 on FIG. 2C is thus 4096×16=65,536 (or $2^{16}$).

Rotary encoders incur ambiguous state errors primarily because, with reference to FIGS. 2A and 2B, the different contact pins 24 travel a significantly different distance around in one revolution of the disk. The difference in distance of travel is the difference in circumference of two paths around the disk. Further, the greatest difference is between least significant bit (LSB) and most significant bit (MSB). For example, if the radius of the MSB track in FIGS. 2A and 2B is 0.2" from the center of the shaft, and the radius of the LSB track is 1" from the center of the shaft, the difference in circumferential travel is a factor of over 5, meaning that the MSB is moving over five times slower than the LSB. Referring again to FIG. 2D, any movement of the encoder disk A will produce $1/4095$ of that movement in encoder disk D. If the cumulative error of the three sets of gears between the disk is greater than $1/4095$ (about 0.088 degrees) of one revolution of the input shaft then a whole bit error occurs at the most significant digit. This equates to a maximum tolerance of less than 0.029 degrees per gear. Such tight manufacturing tolerances are hard to maintain, and variances from tolerance tend to create ambiguous state errors.

As noted above, ambiguous state errors are also caused by ambiguous contacts (such as illustrated as item 29 on FIG. 2B). Turning to FIG. 2C, ambiguous contacts on encoder disk D will cause their own problems on disk D, and will further cause magnified errors on disks C, B and A because the output of encoder disk D has a weighted output of up to 4096 times that of the other disks C, B and A. An ambiguous state on any one disk A, B, C or D can cause a serious error in measurement. The magnification factor over more than one disk again compounds the problem.

It will be understood that Gray code is the most widely used encoding system in encoders of the current art. Other encoding schemes such as binary V-scan are also used in an attempt to compensate for errors such as ambiguous states, or hardware component failure. Binary V-scan (not illustrated) uses two contacts per bit except for the LSB (the LSB allows a valid zero state). These two contact areas for each bit are constructed in a leading and lagging pattern which form a V shape encoding pattern. Error detection is enabled by using one contact to verify the other contact in a progressing set.

Gray code is generally favored over binary V-scan because only one bit may change for each positional step (as illustrated in truth table 15 on FIG. 1A). This makes error detection much easier because if two or more bits change state from one step to the next, then an error is detected.

The foregoing has described the problem in the art of ambiguous states due to imprecise manufacturing or premature contact wear. In addition to this problem, there is the problem of ambiguous states caused by invalid zero state recognition. It will be understood that Gray and binary V-scan encoding, like all codes allowing a valid zero state, are subject to such errors. Referring to the conventional linear electrical contact encoder illustrated in FIG. 1A, it will be seen that if the LSB contact pin 14A fails to make contact with the first contact area at Step 1, then this step is decoded as zero, a full one step error. If the LSB contact pin 14A and the next significant bit contact pin 14B each fail to contact the first two contact areas, the first detectable state is at Step 4, which is actually an error in itself because it will be decoded as Step 7. The first three steps would be decoded as zero, which is a valid but erroneous position. The first valid correct detectable step may indeed not occur until Step 7. The next step (Step 8) is a valid decodable step because only one bit changed. The encoder output will remain at Step 8 until Step C (step 12) which will be decoded as an invalid step because more than one bit changed. The total error prior to detecting the error is then eleven steps. If this error occurred at a fourth digit with a weighted magnitude of 4096/step (as is possible on the multi-turn encoder 27 illustrated on FIG. 2C), the total number of decoding errors would be 4096×11=45,056.

By analogy to the foregoing example, the magnitude of zero state errors can now be appreciated. Should even a one bit error occur on the 2nd, 3rd or 4th disk B through D of the multi-turn encoder 27 of FIG. 2C, because the error will be multiplied by 16, 256 or 4096 respectively. It will be understood that any encoding method allowing zero as a valid state is subject to these errors.

The exemplary use of contact-type encoders in FIGS. 1A, 1B, 1C, 2A, 2B and 2C is not meant to suggest that the above-described problems in the art of ambiguity and reliance on allowing zero as a valid state are unique to such contact-type encoders. In fact, optical, magnetic and other non-contact encoders have an even greater problem with ambiguity and require even tighter tolerances to control. It is often assumed that optical encoders using Gray code are more reliable than contact encoders because errors caused by contact wear and associated component failure are obviated. This can be false security because the encoding is still vulnerable to a zero state error. Light sources (often times LEDs) and light sensors (often times photo transistors) are subject to failure. More importantly, these encoders use integrated circuits for interface with the sensors. The interface circuits are subject to failure where a single integrated circuit chip may cause multiple sensor inputs to remain at the zero state. Thus, in view of the foregoing discussion, it will be appreciated that a single component failure in optical, magnetic and other non-contact encoders can produce undetectable errors of substantial magnitude.

Moreover, optical encoders have their own problems with ambiguity. As noted above, optical encoders are often favored in the current art over contact encoders because optical encoders do not suffer from as many wear-related problems. A typical optical encoder of the current art uses one or more light sources sensed by photoelectric sensors. These encoders nonetheless still continue to use Gray code encoded on plates and disks. FIGS. 3A and 3B depict encoded patterns 31A and 31B respectively, where plates 30A and 30B are opaque and the encoded patterns 31A and 31B are windows or slots selectively allowing light to pass through plates 30A and 30B. Such selective sensor activation is illustrated in FIG. 3C, in which an array of light sources 35 typically selectively energizes light sensors 36 according to the Gray code encoded on the plates 30A and 30B. By analogy to FIGS. 1A and 2A, it will be seen that the encoded patterns of windows or slots 31A and 31B on FIGS. 3A and 3B correspond to the encoded patterns of contact areas 11 and 21 on FIGS. 1A and 2A respectively.

As noted above, however, conventional optical encoders are recognized to be actually more vulnerable to ambiguity problems than contact-type encoders, the absence of contact-related problems notwithstanding For example, it is more difficult to control an optical (or other non-contact) communication path between source and sensor than on a contact-type encoder. Lenses of the light sources and sensors are also subject to moisture and other contamination. Such contamination may cause light to deflect, diffuse and diffract. This may not cause a problem when the encoder window can be manufactured to be in exact alignment with the desired sensory path, but may, as shown on FIG. 3D, cause ambiguous bit errors when the window is just a small amount out of alignment. This condition can often occur on the inner track of a rotary disk such as is illustrated on FIG. 3B, in view the smaller circumference and attendant smaller window size tolerances.

Further, when installed on cumulative gears, conventional optical encoders are also prone to the same error magnification problems described above with reference to FIG. 2C. In fact, optical (or other non-contact) encoders often require even tighter tolerances or the use of stepper type gearing, which severely limits effective operational input shaft speed.

From the previous discussion, it should now be appreciated that rotary optical encoders of the current art require much tighter manufacturing tolerances than their counterpart contact encoders. The problem is exacerbated when physical space limitations require the encoder assembly to be small. Size can be reduced in current art optical encoders by using, as shown on FIG. 3E, a disk or plate 37 providing a reflective encoded pattern. The light sources 35 and sensors 36 may then be deployed on the same side of the disk in order to reduce the size of the assembly. Now even tighter tolerances are required to prevent ambiguous states. As illustrated on FIG. 3F, some current art encoders use a disk or plate 38 providing a combination of encoded windows and reflective surfaces 39 to deflect the angle of the beam of light passing from the sources 35 to the sensors 36. These types of assemblies require yet even tighter tolerances due to the critical alignment of all components.

There is therefore a need in the art for an innovative encoding system which does not require such tight manufacturing tolerances to be reliable and accurate. Maintaining reliability and encoding accuracy while relaxing these tolerances will promote simplicity, robustness and lower cost. Further, if requirements for these tight tolerances are reduced, then source to sensor communications media other than light may be used. Source to sensor communications media having less precise radiation patterns, such as magnetic flux, radio waves, microwaves or ultrasound become serviceable. These alternative communications media may bring specific additional advantages to particular encoder applications or environments.

There is also a need in the art for an innovative encoding method which is not so sensitive to the adverse effects of error magnification in step-up gears. Such a new encoding system would be particularly advantageous by providing reliable and accurate scaling without limiting input shaft speed.

There is a further need in the art for an encoding system that tends to eliminate zero state errors. These types of errors are inherent in the physical susceptibility of hardware to breakdowns. Sources and sensors, and perhaps more importantly interface circuits, have a finite operational lifetime. An encoding system that at least recognizes an erroneous state (rather than erroneously misinterpreting it as an inaccurate valid state) will bring advantage to the encoding art.

SUMMARY OF THE INVENTION

These and other needs in the art are addressed by an inventive encoding system that expects, accepts and interprets both normal and abnormal states of a sensor array, and that further recognizes a zero state as a malfunction. The system is "absolute," in that it allows detection of the best fit detectable position of a movable object with an accuracy equal to the resolution which is equal to one-half the physical displacement of sensors or sources in an array. Such absolute references may be used to define a position detector which properly detects the position of an object after power is applied, even though the object may have moved further after power is removed. As a result, the inventive encoder does not require a battery back-up to detect position accurately after a power failure. This functionality is highly advantageous when detecting shaft position of a multi-turn shaft. The inventive encoding system is also scalable so that there are few limitations in deployment. Truth table logic is employed in a logic function that is designed to implement the foregoing attributes of the inventive encoding system.

It will be noted that embodiments of the invention as set forth below refer from time to time to sensors (or other types of elements capable of being detected in one of two different states) as being in either a "high" or "low" condition. It will be understood that, consistent with the principles of digital logic, that "high" refers to an activated state, and that "low" refers to a deactivated state.

According to one aspect, the inventive encoding system may be embodied in a method for encoding a current state of an array of elements, each element currently in either a high or low condition, the method comprising identifying a set of expected valid normal detected states of the array, the set of expected valid normal detected states excluding a state in which all elements are detected to be in low condition; identifying a set of expected valid abnormal detected states for the array, the set of expected valid abnormal detected states also excluding a state in which all elements are detected to be in low condition; identifying a set of events to which normal and abnormal detected states of the array are to correspond; developing a truth table in which each event in the set thereof corresponds to at least one expected valid normal detected state of the array and at least one expected valid abnormal detected state of the array; polling the current state of the array; and identifying a current event from the set of events based upon the truth table in view of current state of the array as polled.

According to another aspect, the inventive encoding system may be embodied in a method for encoding a positional state of a hierarchical gear assembly, the gear assembly comprising a plurality of interrelated rotary gears, one complete revolution of a lower gear causing a predetermined amount of rotation less than one revolution in an immediately higher gear, the method comprising deploying at least one source on each rotary gear; deploying a sensor array for each rotary gear, each array comprising at least three sensors in sensory communication with the sources on its corresponding rotary gear; identifying a set of expected valid normal detected states for each array; identifying a set of expected valid abnormal detected states for each array; identifying a set of positional states of the hierarchical gear assembly to which combinations of normal and abnormal detected states in each array are to correspond; developing a truth table in which each positional state of the hierarchical gear assembly in the set thereof corresponds to a combination of at least one expected valid normal detected state of each array and at least one expected valid abnormal detected state of each array; polling the current state of each array; and identifying a current positional state for the hierarchical gear assembly from the truth table based upon the combined current states of the arrays as polled.

It will therefore be seen that a technical advantage of the SCALF code invention is that it facilitates sensor array encoding in an environment in which both normal and abnormal states may be interpreted (such as is disclosed and described in co-pending application APD interpreting Abnormal States, referred to above). The inventive SCALF code will be seen to be a novel approach to such encoding that brings about certain further zero-state error detection advantages described below. It will be understood, however, that SCALF code has encoding applications in many embodiments beyond APD interpreting Abnormal States. In fact, SCALF code may be used to encode the condition of any array in which both normal and abnormal states are expected.

A further technical advantage of the SCALF code invention is its ability to minimize errors misinterpreting zero states in the array. By requiring that at least one sensor be activated at all times, encoding of the array according to SCALF code allows hardware to perform Boolean logic simplification in which a zero state output code has meaning as valid normal or abnormal state. SCALF code thus may interpret a zero state in the array as a fault condition.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A depicts a linear Gray code contact encoder according to the current art, together with a representation of the Gray code generated;

FIG. 1B depicts the conventional Gray code encoder of FIG. 1A converting its output to binary code;

FIG. 1C depicts the Gray code to binary code conversion illustrated in FIG. 1B;

FIG. 2A depicts a rotary (endless loop) Gray code contact encoder according to the current art;

FIG. 11 depicts encoding of three related digit gears in an exemplary embodiment of a hierarchical rotary gear absolute position detector;

FIG. 13 is an end-on view as shown on FIG. 12;

FIG. 14 depicts various exemplary encoding errors detectable and correctable via SCALF code;

FIG. 15 is a block diagram illustrating an exemplary SCALF code to binary code decoder;

FIGS. 16 through 21 are Boolean logic expressions illustrating exemplary logic simplification used by hardware on which SCALF code may be deployed;

DETAILED DESCRIPTION OF THE INVENTION

Figure 2B:
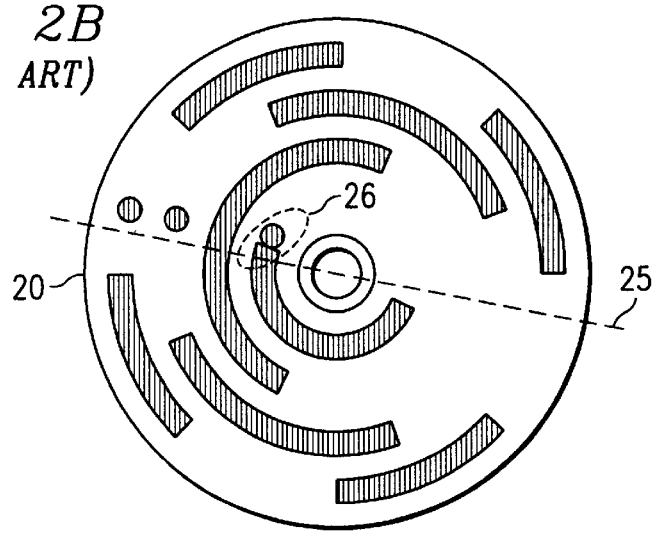
FIG. 2B illustrates the problem of ambiguous contact in a conventional rotary encoder according to FIG. 2A.
Figure 2C:
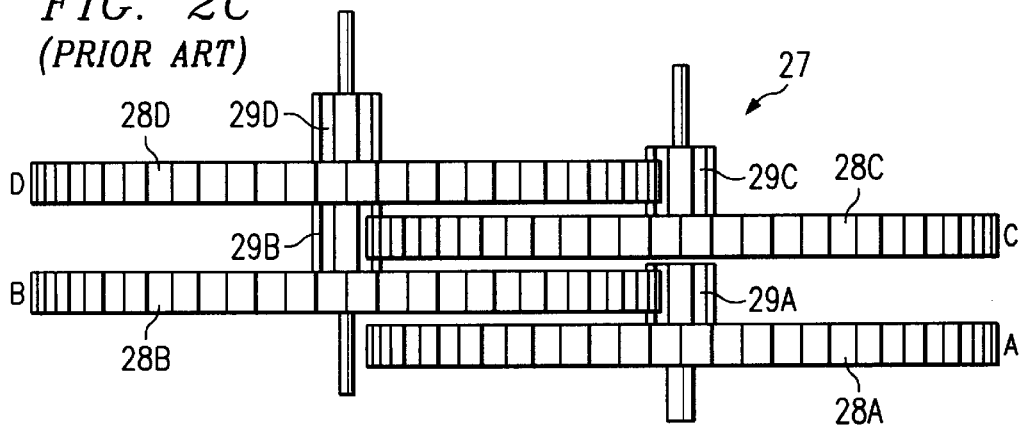
FIG. 2C is a side view of an exemplary gear-enabled multi-turn shaft encoder according to the current art.
Figure 3B:
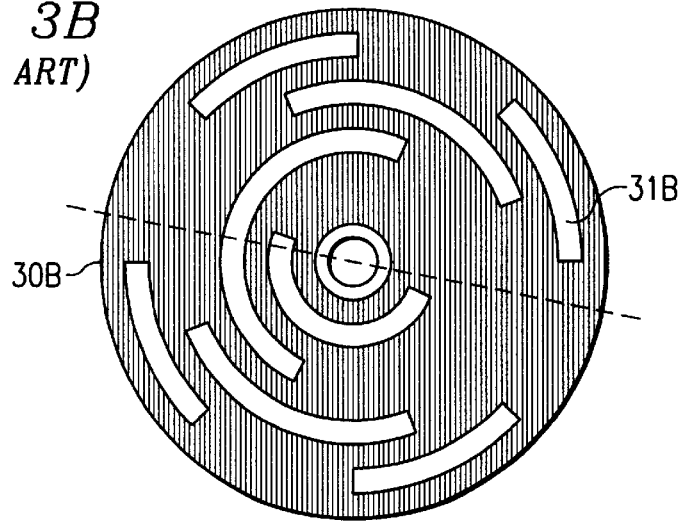
FIG. 3B depicts a rotary (endless loop) Gray code optical encoder according to the current art.
Figure 3A:
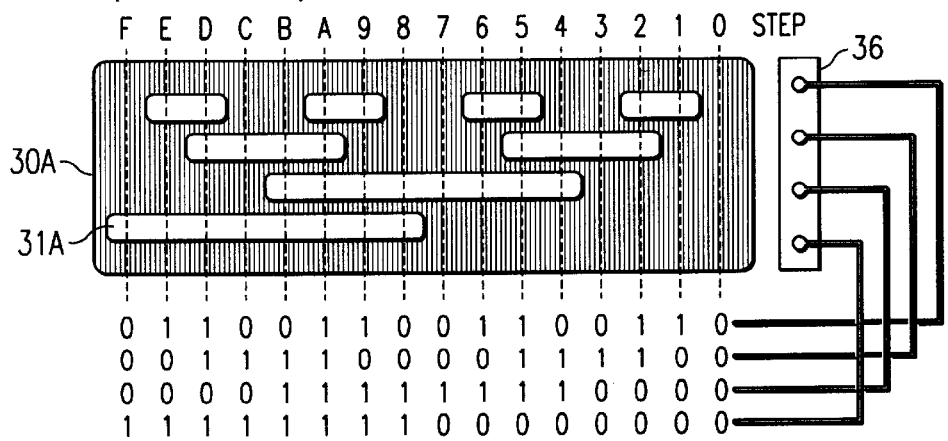
FIG. 3A depicts a linear Gray code optical encoder according to the current art, together with a representation of the Gray code generated.
Figure 3C:
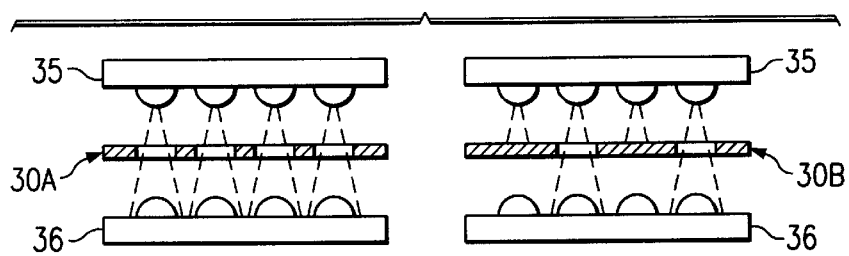
FIG. 3C depicts sectional views of the conventional linear and rotary optical encoders illustrated in FIGS. 3A and 3B.
Figure 3D:
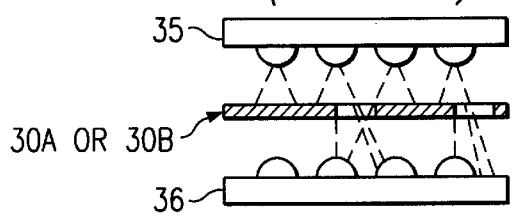
FIG. 3D depicts a conventional optical encoder in a state of misalignment.
Figure 3E:
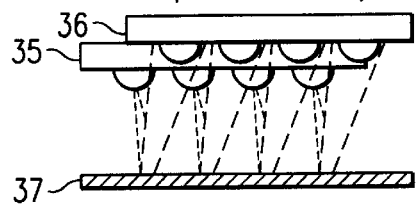
FIG. 3E depicts a conventional optical encoder using reflective surfaces.
Figure 3F:
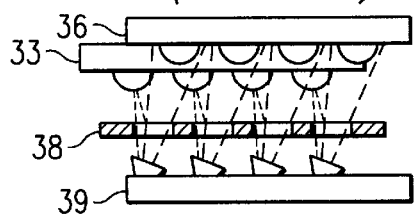
FIG. 3F depicts a conventional optical encoder using a combination of windows and reflective surfaces.

A first embodiment of the invention is described with respect to SCALF code. Named after the inventor, SCALF code is an encoder system implementing aspects of the inventive encoder system described and claimed herein.

SCALF is an acronym for Scalable Code Absolute Logic Function.

Scalable means that the codes being generated by the SCALF "Logic Function" may be scaled up or down. Thus, SCALF is scalable to fit, for example, a preselected number of sensors in an array, or a preselected number of sources in an array, or a preselected number of sensor and source arrays. SCALF is also scalable to fit a preselected numbering system such as, for example, binary (base 2), binary coded decimal (BCD), decimal (base 10), hexadecimal (base 16) and so on. It is understood that SCALF code is not limited to any standard numbering system listed above; yet, it may be decoded (converted) to a desired standard numbering system. A standard numbering system is a convenient choice of the designer of an absolute position detector for interface with output devices such as a display or computer. The number of sensors in an array using one movable source has a practical minimum limit of three (3) and has no maximum limit. The number of sources in an array using one movable sensor has a practical minimum limit of three (3) and has no maximum limit. A system having a moving window with arrays of both sources and sensors has a practical minimum limit of three (3) sources and sensors and no maximum limit. Practical maximum limits of all types of systems may be determined by physical limits of construction but this is not a limit to the scalable range of SCALF codes. The number of abnormal state codes of an array may also be scaled up or down to cover the maximum spread (area of coverage) of source-to-sensor communication outside the normal states.

Code is the combined logical states, of sensors or sources within an array, or within multiple arrays, generated by the logic function of SCALF for the purpose of encoding an absolute position of a movable source or sensor without the need for a device with encoded patterns such as slotted or reflective type encoding plates or wheels or other such devices. Contrary to codes used in conventional encoding systems, codes generated by the SCALF logic function as defined herein accept rather than attempt to reject abnormal source to sensory communication states. Further, contrary to codes used in conventional encoding systems, SCALF codes defined herein preferably do not allow zero sensory states for detection of any one position of source to sensor communication.

Absolute refers to the best fit detectable position of a movable object with an accuracy equal to the resolution which is equal one-half the physical displacement of sensors or sources in an array. Absolute also refers to the best fit detectable position of multiple moving objects in a hierarchy assembly of multiple arrays with an accuracy equal to one-half step of the resolution of the least significant array of the hierarchy. Absolute references may also be used to define a position detector which properly detects the position of an object after power is applied, even though the object may have moved further after power is removed. As a result, the inventive encoder does not require a battery back-up to detect position accurately after a power failure. This functionality is highly advantageous when detecting shaft position of a multi-turn shaft.

Logic Function is a protocol for logically generating codes equivalent to valid normal on/off states and valid abnormal on/off states of an array of sensors (or an array of sources) wherein the generated codes represent the absolute position of a movable object. In SCALF, such codes may be generated without the need for devices with encoding patterns, such as slotted or reflective type encoding plates, or disks, or other such intermediate devices. Consistent with the scalability of SCALF as described above, the logic function also applies to multiple arrays of sensors or arrays of sources. The logic function in SCALF is independent of the communication medium between source and sensor. This opens hardware design and construction to the potential use of many such communication media, such as, for example, magnetic flux, visible light, infrared radiation, ultraviolet radiation, ultrasound radiation, radioactive radiation, electrostatic charge, radio frequency radiation, or microwave frequency radiation. The logic function protocol is advantageously configured to eliminate zero state errors, such as those that might be caused by source or sensor failures.

Describing the logic function in more detail, its protocol follows a series of "rules" that enable the features of the inventive encoding system. Of course, it will be appreciated that there are numerous logic regimes that may be fashioned to enable these features. Further, it will be appreciated that the inventive encoding system is in no way limited to a particular selected "rule" regime of SCALF. In an embodiment of SCALF suitable for implementation on absolute position detectors such as are disclosed in Ser. No. 09/595, 368 ("APD interpreting Abnormal States"), however, the primary "rules" of a serviceable logic function are set forth in Table 1 below:

TABLE 1

| No. | Rule | Comment |
|---|---|---|
| 1. | The number of sensors in an endless loop array of sensors having a single source is half the number of steps recognized by SCALF. | This half-step recognition constitutes the encoding resolution provided by SCALF in an endless loop array environment. |

TABLE 1-continued

| No. | Rule | Comment |
|---|---|---|
| 2. | The number of sensors in an open-ended array of sensors having a single source is half the number of steps recognized by SCALF. | This half-step recognition also constitutes the encoding resolution provided by SCALF in an open-ended array environment. Advantageously, however, one or more sensor(s) are also provided at each open end of the array to allow for decoding abnormal states which may occur at the two ends of travel. |
| 3. | The minimum number of sensors in an array of sensors having a single source is three (3). | |
| 4. | The maximum number of sensors in an array of sensors having a single source has no limit. | |
| 5. | The minimum number of sources and sensors in combined arrays of sensors and of sources is three (3). | |
| 6. | The maximum number of sources and sensors in combined arrays of sensors and sources has no limit. | |
| 7. | Resolution at which a linear moving object (sensor, source, or marker) is measured is one-half the physical spacing (distance) between the sensors in an array of sensors or between the sources in an array of sources. | |
| 8. | Resolution of angular motion of a rotating shaft is the total range of angular movement divided by two-times the number of sensors in an array of sensors or the number of sources in an array of sources; total angular motion of an endless loop has a maximum of 360 degrees but may repeat indefinitely in either direction or may reverse directions. | |
| 9. | The source must have sufficient energy and area of coverage to activate not less than two adjacent sensors of an array of sensors when the source is located substantially between the adjacent sensors. | |
| 10. | All sources of an array of sources must have sufficient energy and area of coverage to activate a single sensor when either of two adjacent sources are independently activated when the sensor is substantially located between the adjacent sources. | |
| 11. | Each positional step, including any datum zero reference, must have one or more sensors of an array of sensors activated by a source, else the existence of a nonfunctional sensor is detected. | |

TABLE 1-continued

| No. | Rule | Comment |
|---|---|---|
| 12. | One or more sources of an array of sources must activate a single sensor for each positional step, including any datum zero reference, else the existence of a nonfunctional source is detected. | |
| 13. | Each incremental positional step within the measurement resolution of the device has a valid normal state (code) and one or more valid abnormal states (codes). | |
| 14. | Only one bit (sensor) may change states for each normal or abnormal step within the resolution of positional measurement. | |
| 15. | Valid normal codes must have either 1 or 2 sensors of an array of sensors activated (true) or a single sensor activated (true) when 1 or 2 sources of an array of sources are independently activated (true). | |
| 16. | Any one positional step within the measurement resolution may have one or more sets of valid abnormal codes. | |
| 17. | A first set of valid abnormal codes for an array of sensors must have one sensor plus two adjacent sensors activated (3 total) or have two adjacent sensors plus one adjacent sensor on each side of the pair of sensors activated (4 total). | If any one sensor within the defined group is not activated, then the existence of a nonfunctional sensor is detected. |
| 18. | A first set of valid abnormal codes for an array of sources must have one source plus two adjacent sources (3 total) sensed by a single sensor or have two adjacent sources plus one adjacent source on each side of the pair of sources (4 total) sensed by a single sensor when each source is independently activated. | If any one source within the defined group fails to activate the sensor, then the existence of a nonfunctional source is detected. |
| 19. | A second set of valid abnormal codes may be used to decode all sensors within large source area of coverage by adding one sensor (bit) to each adjacent side of each valid abnormal group of sensors defined in the first set or adding one source to each adjacent side of each valid abnormal group of sources defined in the first set. | Any number of subsequent sets of abnormal codes may be added by adding adjacent sensors or sources to the second set and then third set and so on. As the number of sensors or sources in a valid abnormal code group is scaled up (expanded), if any one sensor or source within a group fails to active (missing bit) then the existence of a corresponding nonfunctional sensor or source failure is detected. |
| 20. | A datum reference point may be arbitrarily selected at any point in the sensor or source array without the need to allocate a zero state (all sensors deactivated) as the datum reference point. | As a result, encoding values should not be affected by selection of a datum reference point. Decoding logic or truth tables must account for any off-set for alignment with prior art numbering systems which may include zero as a valid state. Decoding logic must perform a valid decode of the normal states and abnormal states for the positional state chosen to represent a datum reference point in the chosen numbering system. |
| 21. | A 'soft' decode datum reference point may be moved to any point in the array(s) for the purpose of calibrating a device. | |
| 22. | When any one of all other possible codes which do not fit the above rules is detected, then an error condition is detected. | |

It will be understood that Table 1 above sets forth some of the primary "rules" defining an exemplary logic function suitable for implementation on absolute position detectors such as are disclosed in Ser. No. 09/595,368 ("APD interpreting Abnormal States"). It will be further understood that Table 1 is a summary of the primary rules suitable for that particular implementation and is not intended to cover every detail or every possible variance within the entire universe of possible applications of SCALF encoding.

An embodiment of SCALF encoding will now be discussed with reference to an absolute position detector using light wave communication between sources and sensors. It will be appreciated that light communication may not always be the optimal communication method in a SCALF code embodiment. In fact, in APD interpreting Abnormal States, embodiments are disclosed using magnetic flux communication. Exemplary use of light wave communication is nonetheless used now so that a better understanding of SCALF code may be had by comparing the following description with the current art optical encoders described above with reference to FIGS. 1A through 3F.

Referring now to FIGS. 4A, 4B, 4C, 4D, 4E, 4F, 5, 6A, 6B, 6C, and 6D, it will be seen immediately that SCALF code enables the encoding member (plate or disk) of previous conventional state of the art encoders to be eliminated. Under SCALF code, it is no longer necessary to interpret only normal states. It will also be seen from the referenced figures that SCALF code further obviates a need to have an array of sources activating a correspondingly-sized array of sensors. With SCALF, as few as only one source may activate an array of sensors need be used, or alternatively as few as a single sensor may be activated by an array of sources.

Figure 4A:
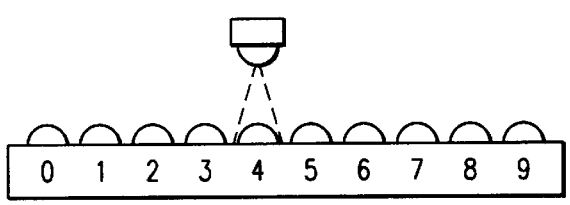
FIGS. 4A through 4F depict a source activating sensors under various exemplary conditions in a linear embodiment, without intervening encoding member, as enabled by SCALF code.
Figure 4B:
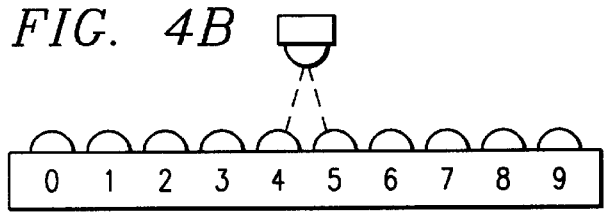
Figure 4C:
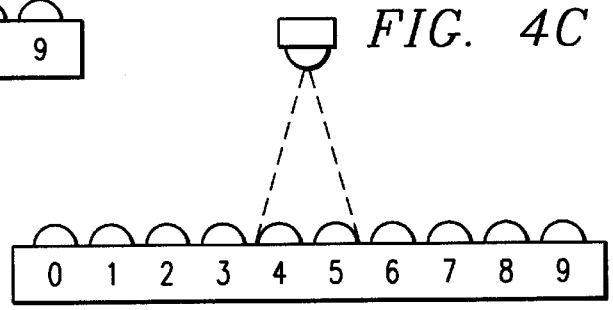

Referring first to FIG. 4A it is understood that light may be focused onto one sensor as in previous discussions. This is satisfactory for sensing only one step of many possible steps. If the source or sensor array are moved so that the source is between two sensors, however, then no communication, or at best, ambiguous communication will occur. This condition may be minimized by defocusing the light source to a wider angle (FIG. 4B), or simply moving source and sensor further apart so that the light coverage generally encompasses at least two sensors of the array (FIG. 4C).

Figure 5:
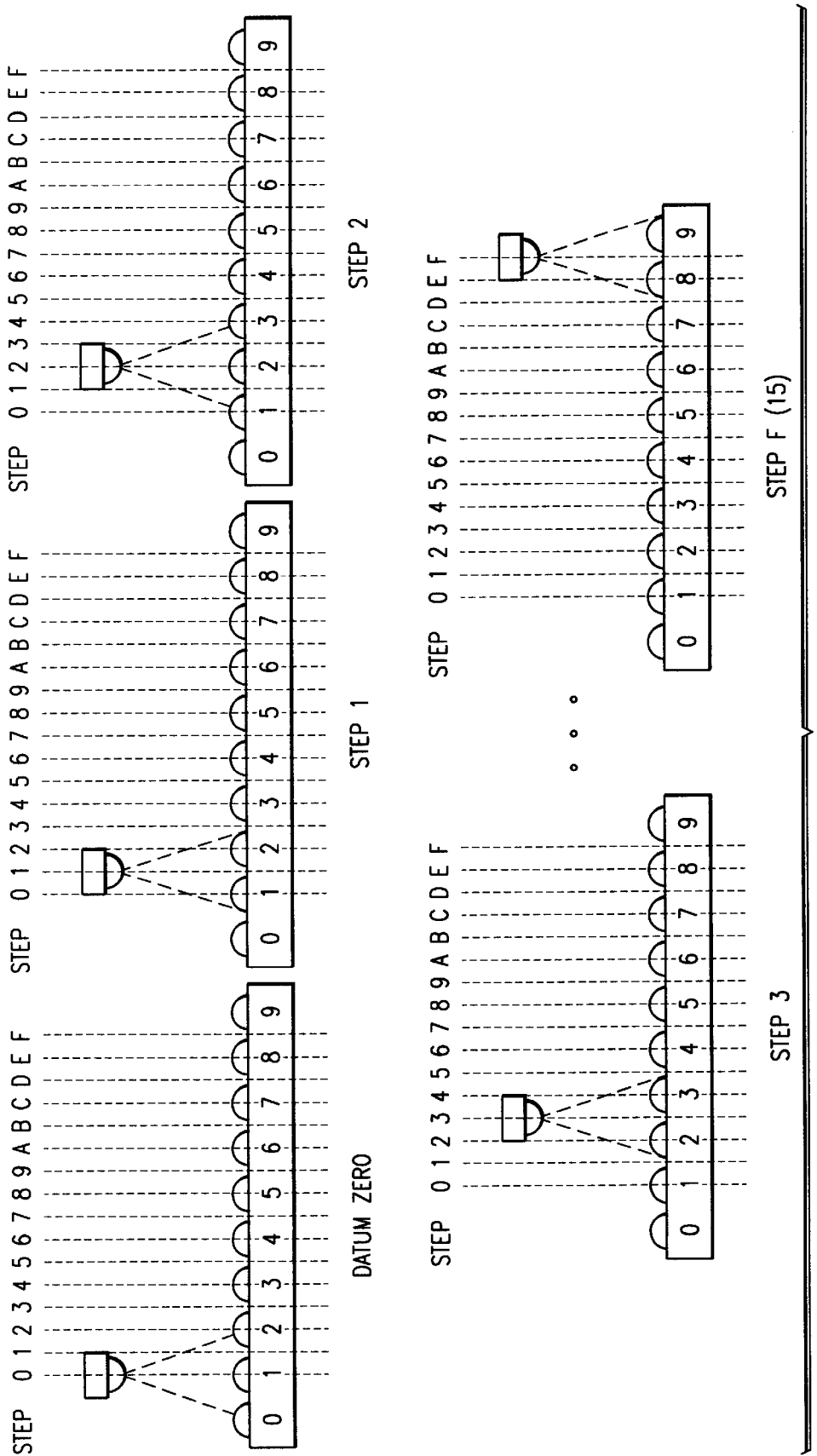
FIG. 5 depicts encoding of exemplary steps 0 through F according to SCALF code in a linear embodiment.
Figure 6A:
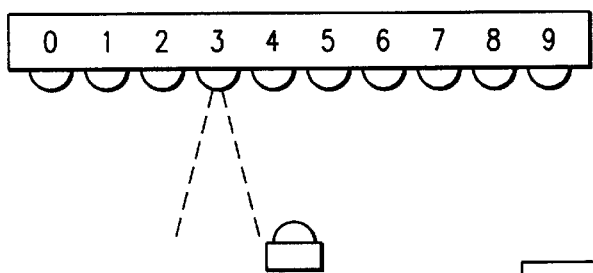
FIGS. 6A through 6B depict sources activating a sensor under various exemplary conditions in a linear embodiment, without intervening encoding member, as enabled by SCALF code.
Figure 6B:
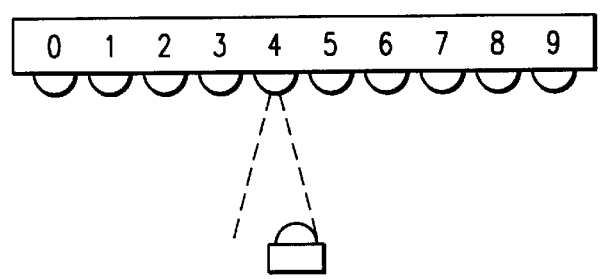
Figure 6C:
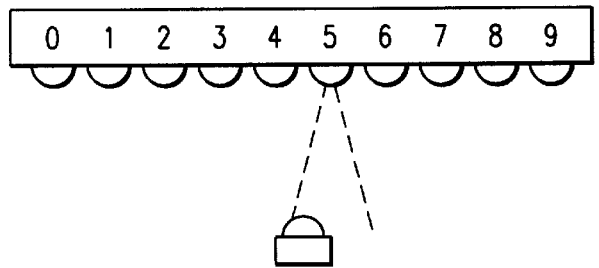
Figure 6D:
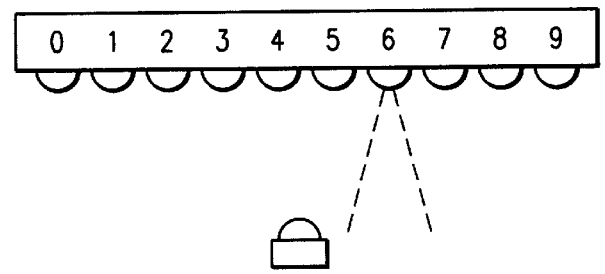

Now referring to FIG. 5, it will be understood that in the exemplary embodiment being described, a datum reference point of value zero has been arbitrarily selected to be at the center of sensor number 1. Linear movement of the source or the sensor array will generate sixteen steps 0 through F as shown in FIG. 5. Sixteen steps normally require half that number of sensors, i.e. eight sensors. Since a zero state is not valid in SCALF code, a sensor is added to each end of travel for a total of 10 sensors.

With continuing reference to FIG. 5, starting with "datum zero," as the source moves to the right or the sensor array moves to the left, the linear movement may be measured by encoding the sensory data using normal states of SCALF encoding. As with previous description, exemplary use of subsequent decoding to binary code was chosen. The encoding to SCALF and decoding to binary for each of the sixteen steps illustrated in FIG. 5 is shown below in Table 2:

TABLE 2

| Step | Binary Code | SCALF Code (normal) 0123456789 (sensors) |
|---|---|---|
| 0 | 0000 | 0100000000 |
| 1 | 0001 | 0110000000 |
| 2 | 0010 | 0010000000 |
| 3 | 0011 | 0011000000 |
| 4 | 0100 | 0001000000 |
| 5 | 0101 | 0001100000 |
| 6 | 0110 | 0000100000 |
| 7 | 0111 | 0000110000 |
| 8 | 1000 | 0000010000 |
| 9 | 1001 | 0000011000 |
| A | 1010 | 0000001000 |
| B | 1011 | 0000001100 |
| C | 1100 | 0000000100 |
| D | 1101 | 0000000110 |
| E | 1110 | 0000000010 |
| F | 1111 | 0000000011 |

Figure 4D:
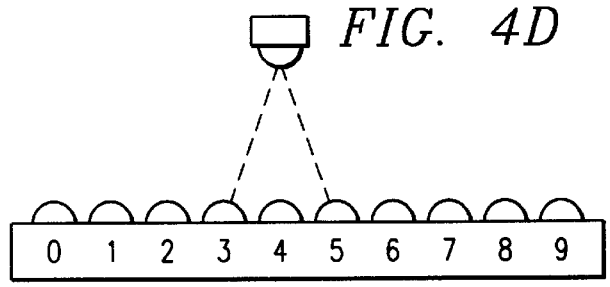

Referring now to FIG. 4D, it will be seen that the source located over sensor 4 could activate adjacent sensors 3 and 5. This is called an abnormal state. Rather than relying on a mechanical solution to try to remove the abnormal state by, for example, focusing the light or trying to tighten tolerances of design and construction, SCALF code accepts this abnormal state and provides encoding data for it.

Figure 4E:
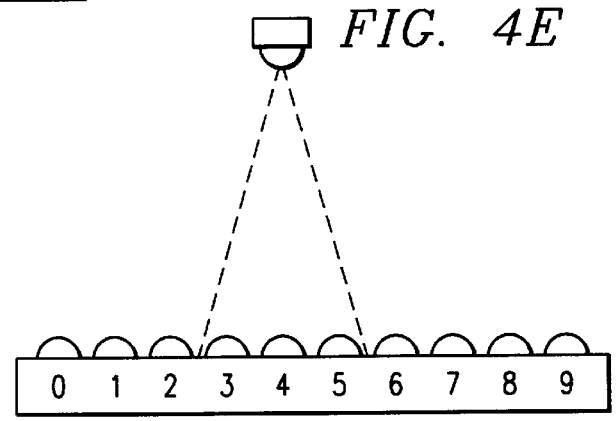

Now suppose that tolerances were worse still, such as the condition shown in FIG. 4E where the light source is moved even farther away from the sensors or defocused to cover a larger area. The normal sensor activation state in this area would be of sensor number 4. However, it would be detected that adjacent sensors 3 and 5 are activated. This is a valid abnormal state as previously indicated. Moving on to FIG. 4F, the source and sensors as shown in FIG. 4E have been moved one step to the right. Notice now that the normal activation states for FIG. 4F would be with sensors 4 and 5 activated. It will be seen that adjacent sensors 3 and 6 may also be activated. Again, rather than relying on mechanical functionality trying to prevent this abnormal condition, SCALF accepts the abnormal states and generates decoding values for them. Using the protocol for SCALF code, a first set of abnormal encoding values may be added to Table 2 as shown below in Table 3:

TABLE 3

| Step | Binary Code | SCALF Code (normal) 0123456789 (sensors) | SCALF Code (abnormal) 0123456789 (sensors) |
|---|---|---|---|
| 0 | 0000 | 0100000000 | 1110000000 |
| 1 | 0001 | 0110000000 | 1111000000 |
| 2 | 0010 | 0010000000 | 0111000000 |
| 3 | 0011 | 0011000000 | 0111100000 |
| 4 | 0100 | 0001000000 | 0011100000 |
| 5 | 0101 | 0001100000 | 0011110000 |
| 6 | 0110 | 0000100000 | 0001110000 |
| 7 | 0111 | 0000110000 | 0001111000 |
| 8 | 1000 | 0000010000 | 0000111000 |
| 9 | 1001 | 0000011000 | 0000111100 |
| A | 1010 | 0000001000 | 0000011100 |

TABLE 3-continued

| Step | Binary Code | SCALF Code (normal) 0123456789 (sensors) | SCALF Code (abnormal) 0123456789 (sensors) |
|---|---|---|---|
| B | 1011 | 0000001100 | 0000011110 |
| C | 1100 | 0000000100 | 0000001110 |
| D | 1101 | 0000000110 | 0000001111 |
| E | 1110 | 0000000010 | 0000000111 |
| F | 1111 | 0000000011 | none (end of travel) |

Figure 4F:
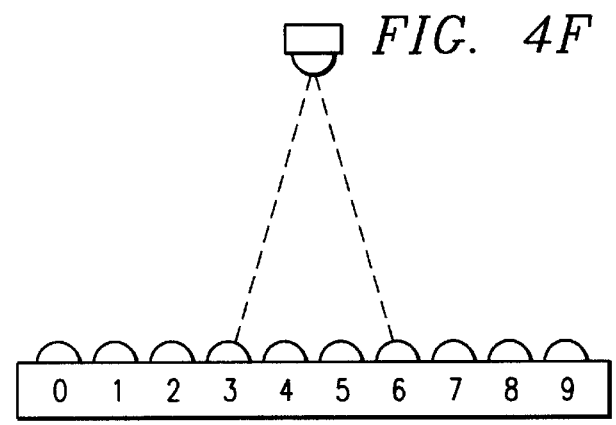

With further reference to FIGS. 4E and 4F, notice that the wide spread can cause a leading error at the maximum travel position. If this condition is undesirable when a wide area of cover is used, then one or more sensors may need be added to the end of travel to eliminate the condition. It will be appreciated, though, that this potential need for extra sensors exists in open-ended linear type deployments, and would not occur in endless loop rotary assemblies (as will be discussed below). It will also be understood by further reference to Tables 2 and 3 that only the encoding normal and abnormal values generated by SCALF code as shown in the truth tables are true and all other possible codes, or an increment which has more than one bit change, is a detectable error condition indicating a sensor or source failure.

It will be further appreciated from reference to Tables 2 and 3 and the accompanying drawings and text that SCALF code is scalable. It will be understood that SCALF code is not limited to the 16 steps shown in the above example. There is no limit to the number of sensors whose state SCALF will encode. If it is desirable to measure a longer distance or a distance with better resolution, then the number of sensors may be increased accordingly. The number of sets of abnormal states may also be increased accordingly. For example, if it is desirable to measure a distance of 12 inches at a resolution of $1/8$ inch for a total of 96 steps, then the number of sensors required for SCALF encoding is $1/2$ the number of steps or 48 plus any additional end marker sensors determined by the area of coverage of the source in a linear embodiment. If the normal area of coverage is three sensors, then the end sensors must account for abnormal sensory states of at least four sensors. This will require two sensors to be added at each end for a total of 52 sensors.

It will also be understood that if it is desirable to measure longer linear distances, the linear motion may be converted mechanically into rotary motion and connecting to a multi-turn absolute detection encoding device using SCALF code, as described later. This concept of conversion into rotary motion uses fewer sensors to measure a greater distance, and further tends to eliminate errors due to linear to rotary interface gearing tolerances. Scaling for rotary measurement devices will be discussed later.

Referring now to FIGS. 6A, 6B, 6C and 6D, an exemplary system is illustrated using a single sensor and an array of sources. The sensor and array of sources move relative to one another. FIGS. 6A through 6D depict the sensor location as substantially between sources 4 and 5. SCALF may be used to generate a truth table of valid normal and valid abnormal codes (encoding) the same way as for the system above as shown in Tables 2 and 3. Using a microprocessor or other state type machine, the sources may be pulsed on in sequence one a time. The sources which activate the sensor determine the position of the sensor. The normal and abnormal codes shown in Tables 2 and 3 are valid for this arrangement by simply identifying the source numbers rather than sensor numbers.

Figure 7:
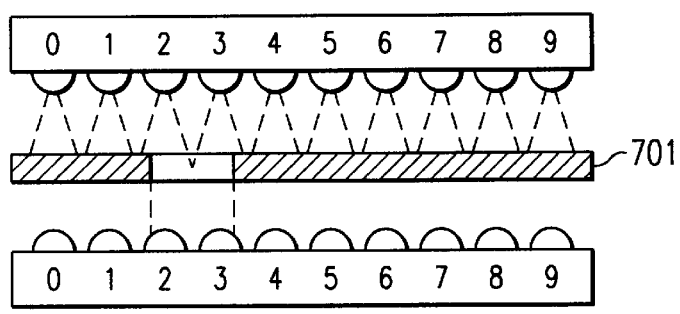
FIG. 7 depicts multiple sources activating multiple sensors in an exemplary linear embodiment.

Referring now to FIG. 7, SCALF code may be embodied on a position detector using both an array of sources and an array of sensors. As illustrated on FIG. 7, the source to sensor communication is then controlled by a moving window 701. FIG. 7 depicts moving window 701 as, for example, a single opening in a plate or disk. The entire array of sources may be pulsed on only at the time of reading the sensors to conserve power. The window 701 then communicates light (or other media) to the sensors though the window. The window may be used to restrict the area of coverage but the same valid normal and valid abnormal codes generated by SCALF may be used to enhance interpretation of ambiguous states.

Looking back at the conventional encoders described above, particularly with reference to FIGS. 3C and 3D, the primary advantage of SCALF code encoding over the prior art, in addition to interpretation of both normal and abnormal states, is elimination of zero state errors and elimination of adverse effects of gear tolerances. This allows SCALF code to be used in applications where a movable source or movable sensors is impractical but a moving windowed member is a practical solution. Such applications include rotary encoder devices, using light or other radiation as a communication medium. It will be appreciated from the discussion that follows that rotary encoders using SCALF code offer significant advantages over current state of the art rotary optical encoders such as described above with reference to, for example, FIGS. 2A, 2B and 3A.

Figure 8:
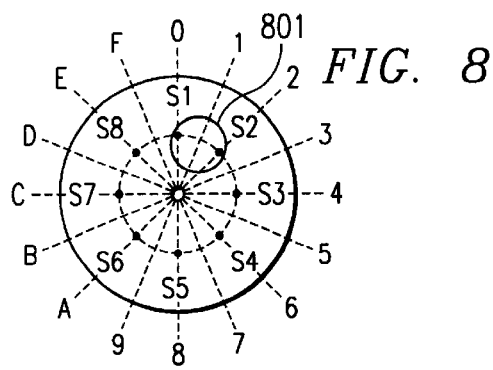
FIG. 8 and FIG. 9 depict a source activating sensors under various exemplary conditions in a rotary embodiment, without intervening encoding member, as enabled by SCALF code.

A popular application of endless loop type position detectors is measurement of the rotational travel of a shaft. Referring to FIG. 8, and with comparison to FIG. 5, it will be seen that an array of eight sensors S1 through S8 may be placed in a circle at equal distance from the center of the shaft to represent 16 steps corresponding to the previous Gray code examples. The sensors are numbered S1 through S8 by choice from top center in a clockwise direction. This is an arbitrary designation. Since the loop is endless, the sensors may be numbered starting at any point around the loop. Again, by choice, the 16 steps are arbitrarily numbered 0 to F starting at the top and incrementing in a clockwise direction. It is assumed that the source is moving or a moving window is between the source(s) and the sensors. The source's area of coverage 801 is shown in FIG. 8 at Step 1 so that it includes a minimum of two sensors.

Figure 9:
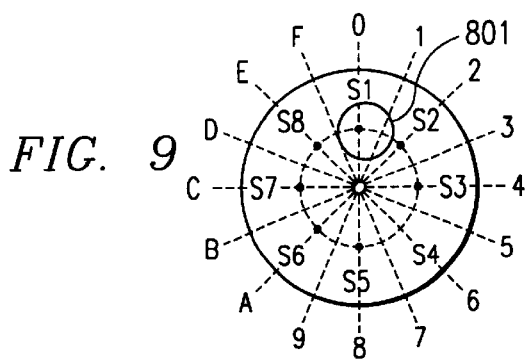

FIG. 9 depicts the source in a half-step position to show the magnitude of error in respect of area of coverage 801 is not greater than one-half step. It will be understood that the error in endless loop systems always leads the direction of travel. These error conditions will be discussed in detail later. It will be also understood that, if the area of coverage 801 was still greater than that depicted but does not activate the next sensor (S2) in less than ½ step then the error is limited to one-half step. If an error is greater than one-half step it is considered one full step which simply changes the step position which may be corrected by calibration as discussed later. It will be appreciated that encoding with SCALF ought never to generate a whole step error, and if this should occur, it may be corrected as discussed in more detail later. It will be understood that if the area of coverage of the source 801 cannot be reduced, then the radius at which the sensors are placed may be increased to increase the separation (distance between sensors) to reduce the leading error to one-half step or less. It will also be understood that a smaller sensing area of the sensor relative to the distance between sensors will help reduce the leading error. If possible, optimal results may be obtained if the sensor area can be arranged to be ¼ (or less) the distance between sensors regardless of the actual size of the area of coverage of the source 801.

It will further be understood that sensors may have hysteresis. Hysteresis errors may be expected to be substantially self-canceling so long as the turn-on hysteresis is relatively close to the turn-off hysteresis. By "relatively close," it is suggested that any one sensor being approached by a moving source is not turned on in more than one half-step after the previous sensor activated by source is turned off. If an unbalanced hysteresis condition exists that produces an error greater than one-half step, then it may be corrected by calibration as discussed later.

It will also be appreciated from FIG. 9, with comparison to linear systems such as illustrated on FIG. 5, that endless loop systems do not require additional end marker sensors to allow for valid abnormal states due to area of coverage of the source.

Figure 10:
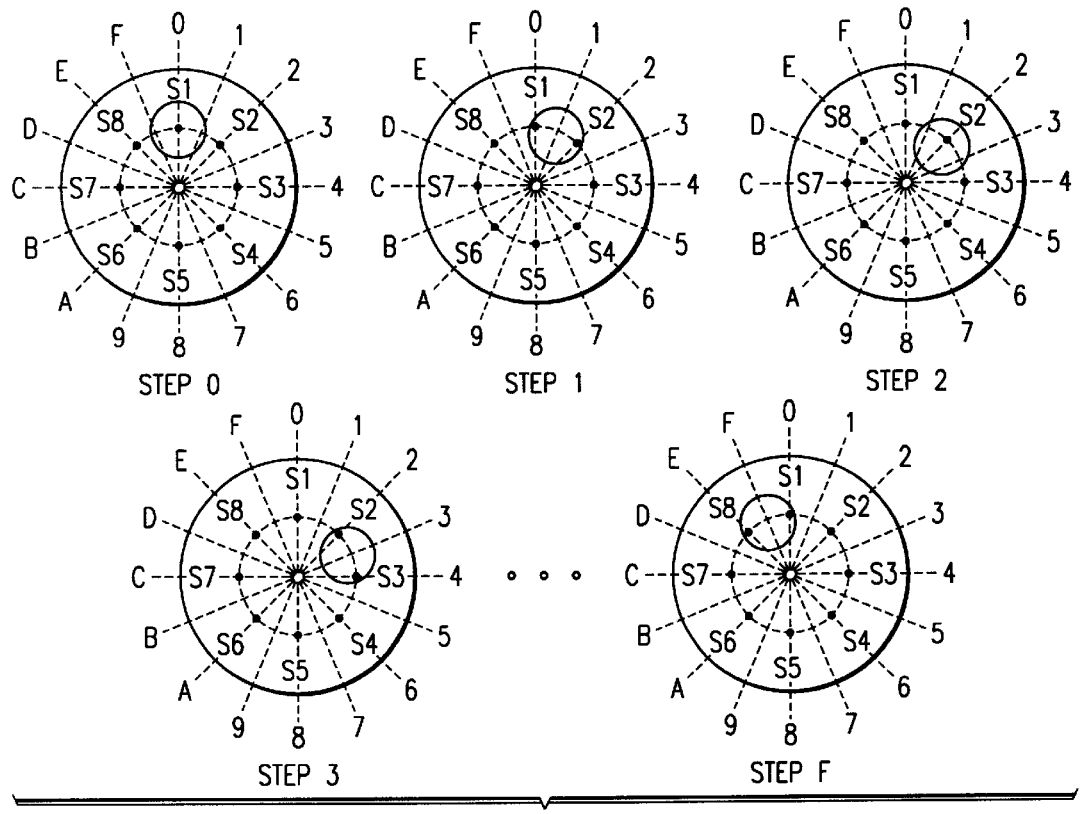
FIG. 10 depicts encoding of exemplary steps 0 through F according to SCALF code in a rotary embodiment.

FIG. 10 is analogous to FIG. 5 in that the steps 0 through F are illustrated for a full rotation of a source with area of coverage 801 as depicted in FIGS. 8 and 9. In accordance with the invention, SCALF logic function protocol may be used to generate a truth table of encoding values equivalent to binary codes for each of the 16 steps the same way as used in previous examples. Starting with Step 0 and incrementing to the last step, Step F, both valid normal and valid abnormal encoded values are generated as shown in Table 4 below. If the position of the step is the center of a sensor then the valid normal code is the single sensor. The valid abnormal code is the center sensor of the normal code plus each sensor adjacent to the center sensor. If the position is between two sensors, then the valid normal code is the two sensors adjacent to the positional step. The valid abnormal code is the two sensors of the normal code plus each of the sensors adjacent to the pair of sensors. It will be understood that any step having more then one bit change is a detectable error, normally due to source, sensor or interface circuitry failure. It will be further understood that any possible code not in the truth table is invalid and is a detectable error.

TABLE 4

| Step | Binary Code | SCALF Code (normal) 12345678 (sensors) | SCALF Code (abnormal) 12345678 (sensors) |
| --- | --- | --- | --- |
| 0 | 0000 | 10000000 | 11000001 |
| 1 | 0001 | 11000000 | 11100001 |
| 2 | 0010 | 01000000 | 11100000 |
| 3 | 0011 | 01100000 | 11110000 |
| 4 | 0100 | 00100000 | 01110000 |
| 5 | 0101 | 00110000 | 01111000 |
| 6 | 0110 | 00010000 | 00111000 |
| 7 | 0111 | 00011000 | 00111100 |
| 8 | 1000 | 00001000 | 00011100 |
| 9 | 1001 | 00001100 | 00011110 |
| A | 1010 | 00000100 | 00001110 |
| B | 1011 | 00000110 | 00001111 |
| C | 1100 | 00000010 | 00000111 |
| D | 1101 | 00000011 | 10000111 |
| E | 1110 | 00000001 | 10000011 |
| F | 1111 | 10000001 | 11000011 |

The rotary disk arrangement illustrated in FIGS. 8, 9 and 10 may be duplicated multiple times in a hierarchy geared arrangement much like the shaft encoder shown in FIG. 2D. If the gear ratio was 16:1, as used in the previous example of FIG. 2D, then each disk would then produce codes which may be decoded to binary or hexadecimal digits with weighted multipliers of 1, 16, 256, 4096 for the 1st, 2nd 3rd and 4th gears respectively. These values have an equivalent base values of 1, $2^4$, $2^8$, and $2^{12}$ respectively for a total of 65,536 steps for a total of 4,368 shaft revolutions.

In any hierarchy geared arrangement, it will be understood that the number of sensors on a disk may be increased to obtain better measurement resolution and the number of disks may be increased or decreased to obtain the desired total number of shaft revolutions. As shown on FIGS. 11 and 12, the number of sensors on each geared disk (digit) may be adjusted to fit other standard or nonstandard numbering systems. The gear ratio between geared disks (digits) may also be adjusted to obtain multipliers other than the examples presented above. Gear ratios may be selected to differ between different sets of gears with different number of sensors to obtain desired number of revolutions and desired angular measurement resolution.

Encoding with SCALF code readily facilitates such selective design of gear and gear ratio combinations. As already noted, an assembly using SCALF code encoding may be constructed using a single source and an array of sensors, or a single sensor and an array of sources, or an array of sources and an array of sensors with a moving window member between the sources and sensors. It is well known in the art of multi-turn position detection devices that the primary resolution of shaft angular position is determined by the first digit (disk) and the number of turns of the shaft are determined (counted) by successive geared digits (disks) in a hierarchical array (stack) where each higher order geared digit (disk) has a weighted value (multiplier) equal to the gear ratio between the digit and the next lower order digit.

With these understandings, the following example is presented to better explain the power of scaling SCALF code to fit specific pre-designed applications. Previous examples have used 16 steps per digit for all hierarchical digits. In such examples, the first digit thus has an angular resolution of 22.5 degrees per step. If the application required a resolution of say, 10 degrees per step for, say 120 revolutions of the shaft, however, the assemblies used in the above examples would not be scaled correctly. One solution might be to add gear reduction at the shaft input to obtain the desired resolution, but this is not optimal because the reduction assembly might add error to the detector via backlash of the added gears.

Figure 12:
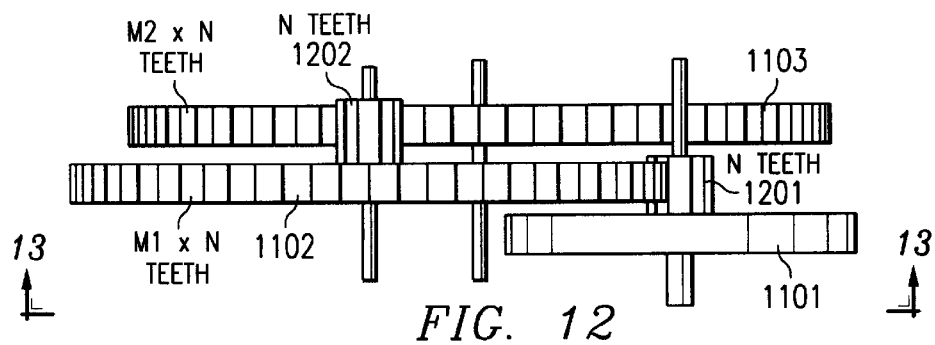
FIG. 12 is a plan view of the physical relationship of the hierarchical gear absolute position detector whose digit gears are depicted on FIG. 11.

A more advantageous solution is to adjust the sensor distribution on the digit gears and encode using SCALF encoding. As shown on FIG. 11, the proper resolution may be obtained by using the proper number of sensors on the first digit disk as shown in FIG. 11. The required resolution is 360 degrees divided by 10 degrees or 36 steps. The first digit (disk) 1101 must have 36 steps or 18 sensors and always has a multiplier of one. The number of required shaft revolutions is 120. It would not be practical to place 60 sensors on a disk sized for a gear ratio of 120:1. Thus two additional geared disks 1102 and 1103 are added as also shown in FIG. 12. FIG. 13 shows an end-on view of a typical arrangement of the three disks 1101, 1102 and 1103 on three different shafts. The required 120 revolutions may be divided into two gear ratios which equal 120, for example, first dividing 120 by 10 equals 12. The second disk 1102 may then have a gear ratio between the first and second of 10:1, producing a multiplier of 10. The third disk 1103 must have a 12:1 gear ratio between the second and third digits (disks) which produces a multiplier of 12. As shown in FIG. 11, for SCALF encoding purposes the second digit must have 10 steps or 5 sensors and third digit must have 12 steps or 6 sensors.

It will now be appreciated that the 60 sensors that would have been required in a single gear step-up have been replaced by 11 sensors in a two-gear step-up. With reference to FIG. 12, if the two small gears 1201 and 1202 have a number of teeth (N) of 10 and a diameter of, say 0.25", then the second digit 1102 must have multiplier (M1) of 10 times N or 100 teeth and be approximately 10 times larger in diameter than the small gear or 10×0.25"=2.50". The number of teeth on the 3rd digit gear 1103 must have a multiplier (M2) of 12 times N or 120 teeth and have a diameter approximately 12×0.25" or 3.00". Notice that the first digit disk 1101 is much smaller although it has more sensors. This digit does not require any gear input. It is attached directly to the input shaft and is required to be only large enough to support the 18 sensors. Notice that the same source area of coverage and the same sensor detection area may be used on all three digits. The radius and angle of displacement of the sensors is scaled for each digit to obtain approximately the same distance between sensors. Each source is placed with a radius approximately equal to the radius of the sensors for each digit. The output of the absolute position detector in this example is (1st digit)×(2nd digit)×(3rd digit) for a maximum of 36×10×12=4320 steps.

It is generally recognized that there are two categories of errors which may occur in absolute position detectors, normal and abnormal. This is to be distinguished from sensors (or arrays of sensors) which may be in normal or abnormal states, as discussed in detail above. Abnormal errors in absolute position detectors are due to abnormal events such as component failures which cause missing bits. As discussed earlier, SCALF code encoding is advantageous in detecting these errors and not confusing them with valid states, as may occur in encoders of the current art.

It was previously discussed how SCALF code reduces the potential for decoding errors by disallowing an "all zero" state. In other encoders, such "all zero" states may be a valid state. Under SCALF code, such an "all zero" state is an invalid state. It will be further understood that SCALF code's ability to detect (and correct) zero state errors is not limited to an "all zero" condition. As discussed above with reference to FIGS. 1A through 2C, encoders of current art generally leave room for significant undetectable decoding errors following abnormal errors in one or more sensors or sources individually, or in source to sensor communication, or in the interface circuitry or decoding circuitry. Such types of failures in interface circuitry and decoding circuitry include "stuck bit(s)," a phrase describing when one or more bits of the interface or decoding circuitry remain in a constant state regardless of a change in conditions that might otherwise cause the bit's state to change.

It will be appreciated that SCALF code prevents these types of failures from causing an error greater than one step of the least significant digit. Refer to items 17 and 18 in Table 1. SCALF code encoding does not allow zero as a valid normal state, and further does not allow abnormal states of a group of three or more elements to have any one element within the boundaries of the group to be deactivated (where group boundaries are defined by presents of activation of a first and last element of a group). In this way, SCALF code will not allow abnormal errors greater than one step of the least significant digit, since SCALF code only allows a one step (one bit change) increment or decrement to occur between readings. If a one step error occurs on a higher order digit of a geared multi-turn assembly, for example, a one bit error will be detected due to the fact it will cause a change equal to the gear multiplier.

Examining this feature of SCALF code in more detail, it was noted earlier that significant undetectable encoding errors may occur should one or more bits fail in the encoding devices of the current art shown in FIGS. 1A through 2C. In contrast, SCALF code will detect these errors in excess of one step because any failure of one or more sensors, sources, source to sensor communication or interface circuitry will produce an invalid code if the error is greater than one step. Using the example of FIG. 10 and the truth table of Table 4, let it be assumed momentarily that sensor S2 has failed in a deactivated ("low") state. This failure, an abnormal error, could be attributable to any one of the component or hardware conditions suggested above. Referring now to FIG. 10, at Step 0, if the area of coverage of the source is only one sensor then the position would be encoded properly as 10000000. If the area of coverage was three sensors, however, the position would be encoded as 100000001, equivalent to Step F, a one step error. Moving on to Step 1, if the area of coverage is two sensors, then Step 1 will be encoded as 10000000, equivalent to Step 0, again a one step error. If the area of coverage is four sensors then Step 1 will be encoded as 10100001, which under SCALF code is an invalid code (having 0 in a group whose first and last element is a 1). This detected error may then be corrected in decoding by inserting the missing bit. The corrected code then becomes 11100001, which is an valid abnormal state for Step 1. Moving to Step 2, if the area of coverage is one sensor, then the position will be encoded as 00000000, an all-zero state recognized by SCALF code to be an error condition. If the area of coverage is three sensors, Step 2 will be encoded as 10100000. As already noted, SCALF code recognizes this result as an invalid abnormal state which may be corrected to 11100000, a valid abnormal state.

It will thus be appreciated that SCALF code will not permit abnormal zero state errors to cause an encoding error greater than one step. It will be further appreciated that SCALF code enables such error detection regardless of the direction of movement of sources and sensors. Moreover, it will be understood from the forgoing example that SCALF code also permits correction of these types of zero state errors. When the source to sensor area of coverage is three or more sensors, then an error caused by a missing bit within a group of bits may be replaced by inserting a bit to produce a corrected code (step). Such error correction by inserting missing bits is another advantage of the "soft" encoding feature of SCALF code.

As just described, SCALF code allows its decoder to detect such abnormal error conditions by sensing, for example, a zero state, a missing bit or multiple bits changing from one step to the next. Clearly, in order to detect these error conditions, the encoding and decoding electronics must sample and execute faster than the step change rate of the input shaft. This is generally not a problem in hardware implementations using current day semiconductor technology. If computer software is used to decode the encoded values from a truth table, however, then execution of the software must be faster than the step change rate of the input shaft else a hardware type or dedicated microprocessor type decoder may be required. Decode logic may be implemented by off-the-shelf devices such as integrated circuit logic gates, programmable gate array (PGA), field programmable gate array (FPGA), programmable logic array (PLA), programmable logic device (PLD), erasable programmable logic device (EPLD), or application specific integrated circuit (ASIC). The decode, error detection and error correction functions (described later) may also be performed by a small, low cost, yet high speed dedicated microprocessors or microcontrollers generating decoded outputs for input to another computer, microprocessor or microcontroller.

Normal absolute position detector errors are caused by design and construction tolerances. SCALF code encoding tends to stabilize and minimize these errors. It was stated earlier that absolute position detectors using SCALF encoding may cause an error up to ½ step, as shown in FIG. 9. This condition is further explained with reference to FIG. 14. From FIG. 14, it will be seen that devices using SCALF encoding always produce a leading error in the direction of travel regardless of the actual size of the source area of coverage 801. This also means that SCALF encoding can never produce a lagging error, regardless of direction of travel. The leading error is always local to and inclusive of each disk (digit) regardless of the position (weighted value) of the digit in a hierarchy of digits in a geared relationship. This means that the errors on multiple disks (digits) are not cumulative. It is understood that the ½ step error is always leading in the direction of travel regardless of the direction of rotation or reversal thereof. This means that the next step is detected ½ the angular resolution of measurement of the input shaft in the direction of travel of the shaft. Multi-turn position detectors using linear gearing between digits produce an error equal to the backlash between the two gears as a result of tolerance in gear mesh due to design or gear wear over time. This error is always a lagging error which means that a higher order digit is lagging the next lower order digit by the amount of gear backlash. Lagging gear error offsets (subtracts from) the leading encoding error of the next higher order digit in a system using SCALF encoding.

In conventional encoder systems the encoded pattern can not be adjusted to cause a leading encoding error. Any alignment of source to sensor communication of any one or all bits relative to the encoded pattern may not be adjusted for a leading error because this would result in a lagging error when the shaft reverses direction. Any lagging error in encoding will accumulate with gear lag error and will cause serious decoding error in conventional encoder systems. If a three gear stack such as the example shown in FIG. 12 has a gear backlash of ¼ step between the 1st and 2nd digits 1101 and 1102, and ¼ step between the 2nd and 3rd digits 1102 and 1103, then the total lag error would be ½ step of the lower order gear. Admittedly, these would be extremely sloppy gears in an actual implementation, but the foregoing illustrates by example how tight tolerances of other encoder designs can be enhanced using SCALF encoding. The error of a conventional encoder would be ½ step plus any lag of encoder disk. If these conditions existed in a SCALF encoded system, the absolute position detector would have an accuracy of plus and minus one-half step of the least significant digit. In the case of the 3-digit example of FIGS. 11 and 12, this would be plus and minus 5 degrees. If a gear with a tolerance of ¼ step was added to the input shaft, then the accuracy would be improved to plus or minus 2.5 degrees.

Errors caused by gear backlash, or other mechanical tolerances, can not be detected by conventional encoding and decoding systems. However, these errors actually improve the accuracy of systems using SCALF encoding. Considering the above example where the tolerance of the gear between the 1st and 2nd digit lags by ¼ step. This ¼ step is subtracted from the leading ½ step error of the 2nd digit, improving the accuracy of this digit to ¼ step. Now consider the condition where the gear between the 2nd and 3rd digits has a lag of ¼ step. This ¼ step is cumulative with the lag of the previous gear and then subtracted from the lead of the 3rd digit. Thus, ½ step lag subtracted from ½ step lead of the encoded step will produce a perfect step of the highest order 3rd digit.

For whatever reason, if a one step error occurred between higher order digits, the error would be multiplied by the gear ratio between the two digits. Such large magnitude errors may be detected by a rollover/rollunder mechanism. It will be appreciated that each time a digit gear (disk) makes one revolution, it increments the next higher digit by one step. The point at which the next step of the higher order digit occurs is expected (predicted) at a specified step of the lower order digit. This point is called rollover if the digit is incrementing from a last step to the zero step, or rollunder if the digit is decrementing from the zero step to the last step of any one digit.

The 1st digit gear 1101 as shown in FIG. 11 will be used to demonstrate rollover and rollunder. Rollover would occur when the disk increments from Step 35 to Step 0. Rollunder occurs when the digit decrements from Step 0 to Step 35. In a continuous geared system like the examples above, the gears may have misalignment due to incorrect assembly. Misalignment means that an error in the actual rollover/ rollunder step may occur one or more steps from the assumed step position where the next higher order gear is predicted to step. The rollover/rollunder position may be detected by detecting when the next higher order gear increments/decrements. In the example of FIG. 11, if the 2nd gear 1102 incremented between, say, Steps 11 and Step 12 of the 1st digit gear 1101, the error would be 12 steps. If the 3rd gear 1103 incremented between, say, Step 4 and Step 5 of the 2nd digit gear 1102, the error would be 5 steps of the second gear 1102. The total error of the two digits would be 12×5=60 steps or 13.9% of the total 4320 steps.

Conventional state of the art encoders have encoding patterns in the gears or disks with rollover and rollunder points which can not be adjusted. This is called "hard" encoding. In contrast, SCALF code encoding has a unique feature of "soft" encoding. As stated earlier, under SCALF code, step 0 may be selected at any point within the sensor array. This means that SCALF code allows the rollover/ rollunder point to be changed, allowing an absolute position detector to be calibrated to remove all one-step or multiple-step errors that may occur between any two digits. For ease of reference, the 2nd digit gear 1102 of FIG. 11 will be used to demonstrate. A truth table of the 2nd digit 1102 in the exemplary implementation of FIG. 11 is shown in Table 5 below. For simplicity and clarity, only the normal decode digits are shown.

TABLE 5

| Step | SCALF Code (Normal) 54321 (sensor #) |
|---|---|
| 0 | 00001 |
| 1 | 00011 |
| 2 | 00010 |
| 3 | 00110 |
| 4 | 00100 |
| 5 | 01100 |
| 6 | 01000 |
| 7 | 11000 |
| 8 | 10000 |
| 9 | 10001 |

As suggested in the example above illustrating the rollover/rollunder error phenomenon, if the rollover/ rollunder step is detected to be between Step 4 and Step 5 (according to when the 3rd digit 1103 increments or decrements), then the step sequence may be rotated to align with this point. This means that Step 0 is now selected to be at what was previously labeled Step 5, and Step 9 is now at what was previous labeled as Step 4. The truth table for 2nd digit 1102 is now as shown below in Table 6 (where again, for simplicity and clarity, only the normal decode digits are shown).

TABLE 6

| Step | SCALF Code (Normal) 54321 (sensor #) |
|---|---|
| 5 | 00001 |
| 6 | 00011 |
| 7 | 00010 |
| 8 | 00110 |
| 9 | 00100 |
| 0 | 01100 |
| 1 | 01000 |
| 2 | 11000 |
| 3 | 10000 |
| 4 | 10001 |

The foregoing calibration methodology may be used for each digit in the absolute position detector in a progression from least significant digit to the most significant digit. The new calibrated points may be stored to nonvolatile memory such as Flash memory or EEPROM. This calibration process may be run at time of assembly and test of the device, meaning that no special assembly techniques or alignment of gears is required during assembly. Although the device should never need calibrating again, the calibration may be further executed "on the fly" while the absolute position detector is in normal use in order to detect errors between digits in case of mechanical failures.

The foregoing advantages of SCALF encoding for error detection and correction in continuous geared systems also extend to stepper (or "stepping") geared systems. In fact, the re-identification of Step 0 as described above for SCALF code recalibration is easily implemented in stepping type geared systems because the rollover/rollunder step is very predictable due to the required assembly. "Stepper" systems hold the higher order gear (digit) in a fixed position until a step geared point is reached which then increments the next gear by two teeth for each revolution of a lower order gear. A whole digit error is unlikely in these type systems but can occur. Should an error occur, SCALF encoding can detect the error by monitoring the rollover/rollunder point of each gear via detecting when the next higher order gear (digit) step occurs. Using an example of a 3-digit stack of stepper geared digits having a multiplier of 16 between each gear and each gear having 16 steps, the process of error detection may be explained. Should a one step error occur between the 1st and 2nd digits the error is the multiplier of 16. If a one step error occurs between the 2nd and 3rd digits the error is the multiplier of 256. This is a possibility for significant error.

In this example, the predicted rollover point would be between the F (15th) Step and 0 Step. If the next higher order digit does not increment when the rollover point of a lower order digit is detected, then one step should be added to the next higher order digit. When all digits are summed according to the weighted values, the total may not change by more than one step. If a higher order gear does not decrement when a lower order digit decrements through the rollunder point, one step should be subtracted from the next higher order gear. When all digits are summed according to their weighted values, the total may not change by more than one step. Another approach is to test the total value for errors after they are summed. If the total changes by a an amount equal to a digit multiplier, then a one step error has occurred in the digit equal to the multiplier. In the above example, if the error was 16 then the error occurred in the 2nd digit. If the error was 256 then the error occurred in the 3rd digit. It will be appreciated that all of the foregoing can be detected by SCALF encoding and be identified according to the foregoing logic either by hardware or software in the decoding process.

Correction may also be implemented in the decoder. If a one bit error is detected for any one higher order digit as described above, the error may be corrected in step geared systems by adding or subtracting any one digit's multiplier value to the total reading to produce not more than one step change in the summed total. Care must be taken not to correct any one digit more than one time, else a mechanical failure may not be detected. Error corrections are advantageously saved to nonvolatile memory in case of power failure. The corrections are then applied to the position reading when power is returned.

It will be appreciated from the above discussion of SCALF encoding that SCALF code is compiled by concatenating individual sensor states into individual strings of predefined length. Using logic as set forth in exemplary fashion below, the strings may then be decoded to any computer-compatible code such as binary (base 2), binary coded decimal (BCD), octal (base 8), hexadecimal (base 16), and Gray code. It is generally optimal to decode to binary code when decoding with a computer device such as a microprocessor or microcontroller. The exemplary implementation of SCALF code described herein includes a decoding to binary code, although it will be understood that such selection of decoding to binary code is not a limitation on SCALF code.

As noted above, converted to binary code by either hardware using logic gates embodying truth table logic, or by software using a logic truth table as a lookup table. Hardware decoding may be accomplished by any of many types of hardware circuitry, such as logic integrated circuits, programmable gate arrays (PGA), field programmable gate arrays (FPGA), programmable logic devices (PLD), programmable logic arrays (PLA), erasable programmable logic devices (EPLD), and application specific integrated circuits (ASIC).

In order to demonstrate an example of SCALF code decoding, further exemplary use will now be made of the rotatable sensor array illustrated in FIG. 8, with sensors S1 through S8 enabling encoding in SCALF code of 16 steps in 0 through F as illustrated in FIG. 10.

A truth table may be generated as set forth in Table 7 below for decoding SCALF code to binary code for the array of FIG. 8. Each SCALF code string representing a state of the sensor array comprises the on/off states of the eight sensors (S1–S8), shown from right to left starting with S1 on the right. The binary bits are aligned as $2^3, 2^2, 2^1, 2^0$ and the sensors are aligned as S8, S7, S6, S5, S4, S3, S2, S1.

TABLE 7

| Binary Code | SCALF code (normal) | SCALF code (abnormal) |
| --- | --- | --- |
| 0000 | 00000001 | 10000011 |
| 0001 | 00000011 | 10000111 |
| 0010 | 00000010 | 00000111 |
| 0011 | 00000110 | 00001111 |
| 0100 | 00000100 | 00001110 |
| 0101 | 00001100 | 00011110 |
| 0110 | 00001000 | 00011100 |
| 0111 | 00011000 | 00111100 |
| 1000 | 00010000 | 00111000 |
| 1001 | 00110000 | 01111000 |
| 1010 | 00100000 | 01110000 |
| 1011 | 01100000 | 11110000 |
| 1100 | 01000000 | 11100000 |

TABLE 7-continued

| Binary Code | SCALF code (normal) | SCALF code (abnormal) |
| --- | --- | --- |
| 1101 | 11000000 | 11100001 |
| 1110 | 10000000 | 11000001 |
| 1111 | 10000001 | 11000011 |

The truth table in Table 7 above may now be used as a lookup table by computer software to decode SCALF code readings of the sensors to binary code by comparing the current state of the sensor array with both the SCALF normal and SCALF abnormal values of Table 7.

Decoding to binary is also available in hardware and indeed may be preferable in high speed service where array states may change faster than software execution. Hardware decoding in the exemplary sensor array of FIG. 8 is illustrated on a block diagram with eight sensor inputs and four binary outputs as shown on FIG. 15.

If hardware decoding is used, it is advantageous to reduce the number and complexity of the logic gates. The decoding logic may be simplified by Boolean algebra after decoding the truth table to Boolean expressions shown in the equation set shown in FIG. 16.

If the Boolean expressions on FIG. 16 were converted directly to positive logic gates, it would require at least thirty-two 8-input AND gates, making the decode circuitry more complex. The Boolean expressions above may be reduced to the equations shown in FIG. 17. This reduction requires only 4-input AND gates. Each AND expression is labeled (A1–A32) to simplify schematic capture.

It will be noted that according to the rules of Boolean algebra, it is theoretically possible to reduce the logical AND expressions of FIG. 17 further. Such simplification of AND expressions is not recommended in this application, however, in case the integrity of error detection is rendered less effective. It may nonetheless be possible to simplify or reduce OR logic expressions of FIG. 17 further without losing error detection security. Specifically, it may be possible to combine terms in FIG. 17 to reduce the number of logical OR gates or the number of gate inputs to match standard logic integrated circuits.

Figures 14, 18, 19:
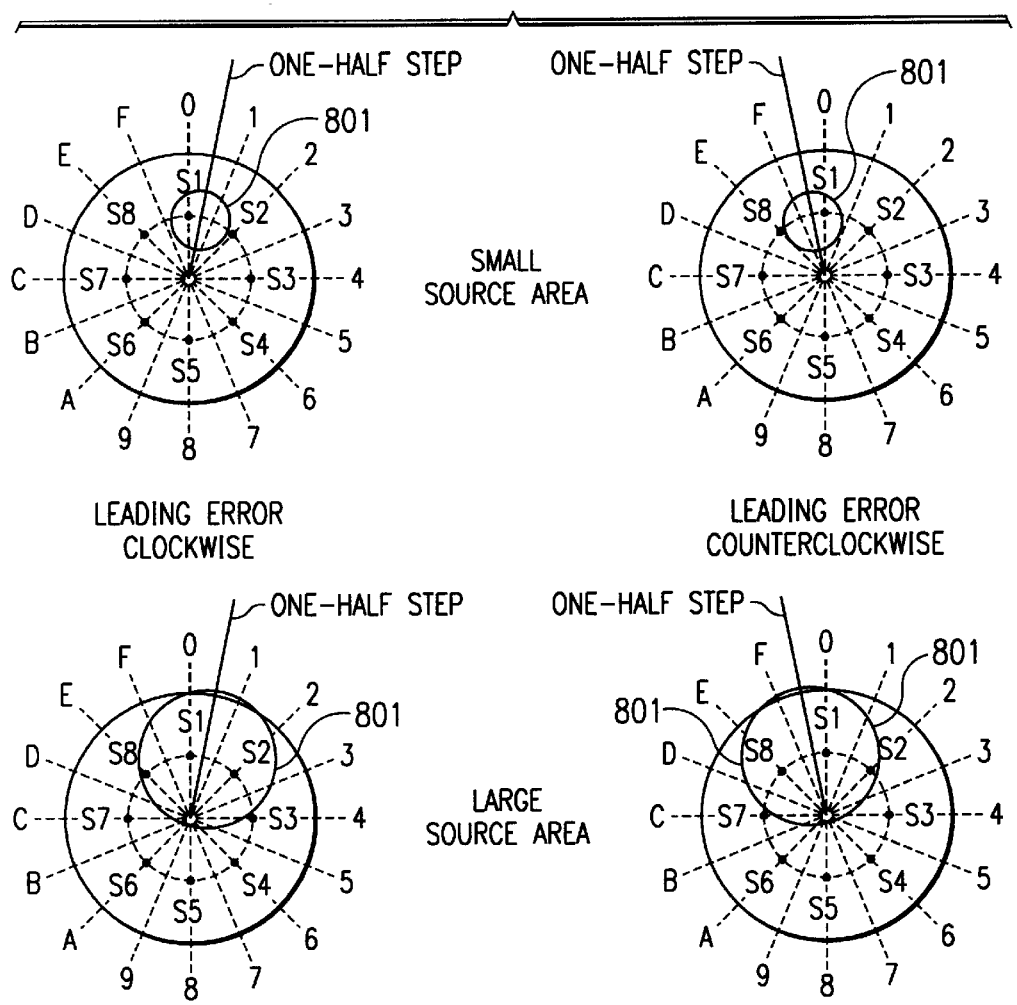

FIG. 18 illustrates how binary bits B1–B4, plus the binary zero state labeled bit B0, can be combined from the expressions of FIG. 15 to generate gate inputs to suit the exemplary converter illustrated in FIG. 17. It will be recalled from Table 1 that in SCALF code, every state, including the zero state, must have at least one sensor turned on (activated). It will be seen that according to the rules of Boolean algebra, it is not absolutely necessary to decode the zero state. Indeed, not decoding the zero state might save several logic gates in the hardware. In accordance with the SCALF code invention, however, the zero state (B0) is decoded to add security to the decoding function. The zero state B0 is decoded to gate positive logic decoding of all other states.

FIG. 19 illustrates the Boolean expressions obtained when solving for B1, B2, B3 and B4 on FIG. 18 using the equations of FIG. 17. Common expressions of FIG. 19 may now be combined to simplify the OR logic. The common terms chosen to be combined are underlined, so chosen to enable two-input OR gates to be used as hardware. The combined terms are labeled C1–C15 as illustrated on FIG. 20. Now each binary bit may be expressed as illustrated on FIG. 21.

It will be apparent from FIG. 21 that additional OR terms may be combined if desired. FIG. 21 nonetheless illustrates a sufficient level of OR term combination to enable hardware such as illustrated on FIG. 15 having a reasonable number of gates and gate inputs of standard integrated circuits.

It is also interesting to note the 1248 weighted values of binary coded numbers is becoming apparent from FIG. 21. Notice that B1=C1, B2=C2, B3=C4, B4=C8, highlighting the 1248 weighting of binary code.

Figures 22, 24, 27:
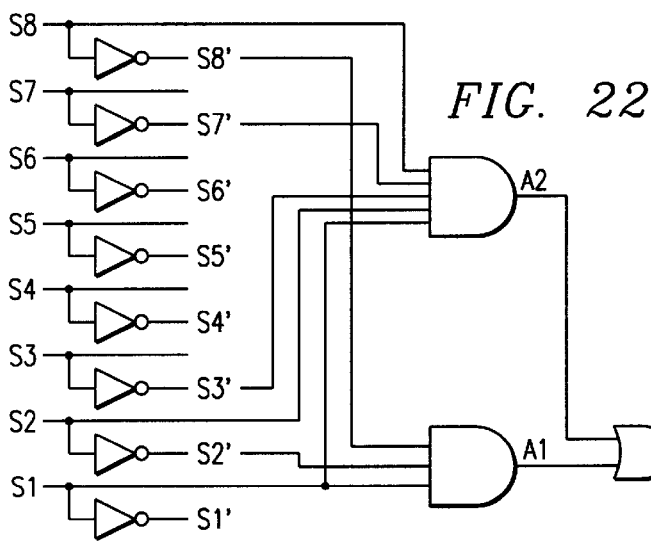
FIGS. 22 through 25 are block diagrams representing exemplary hardware implementations of the Boolean logic of FIGS. 16 through 21.
FIG. 27 is a block diagram illustrating an alternative hardware implementation of SCALF code decoding using negative logic instead of positive logic.

The Boolean expressions of FIG. 21 may now be implemented in hardware logic. Logic diagrams may be represented in several ways. The schematic diagrams of FIGS. 22–25 are presented with standard positive logic gates allowing use of standard off-the-shelf integrated circuits. The zero state (B0) should be decoded so that all other bits are not true during the zero state. FIG. 22 illustrates an example of decoding the "zero" state using all positive logic. FIG. 22 also includes the sensor inputs (S1–S8) and their inverted state (S1'-S8') used by all other functions shown in other schematic figures.

Figure 23:
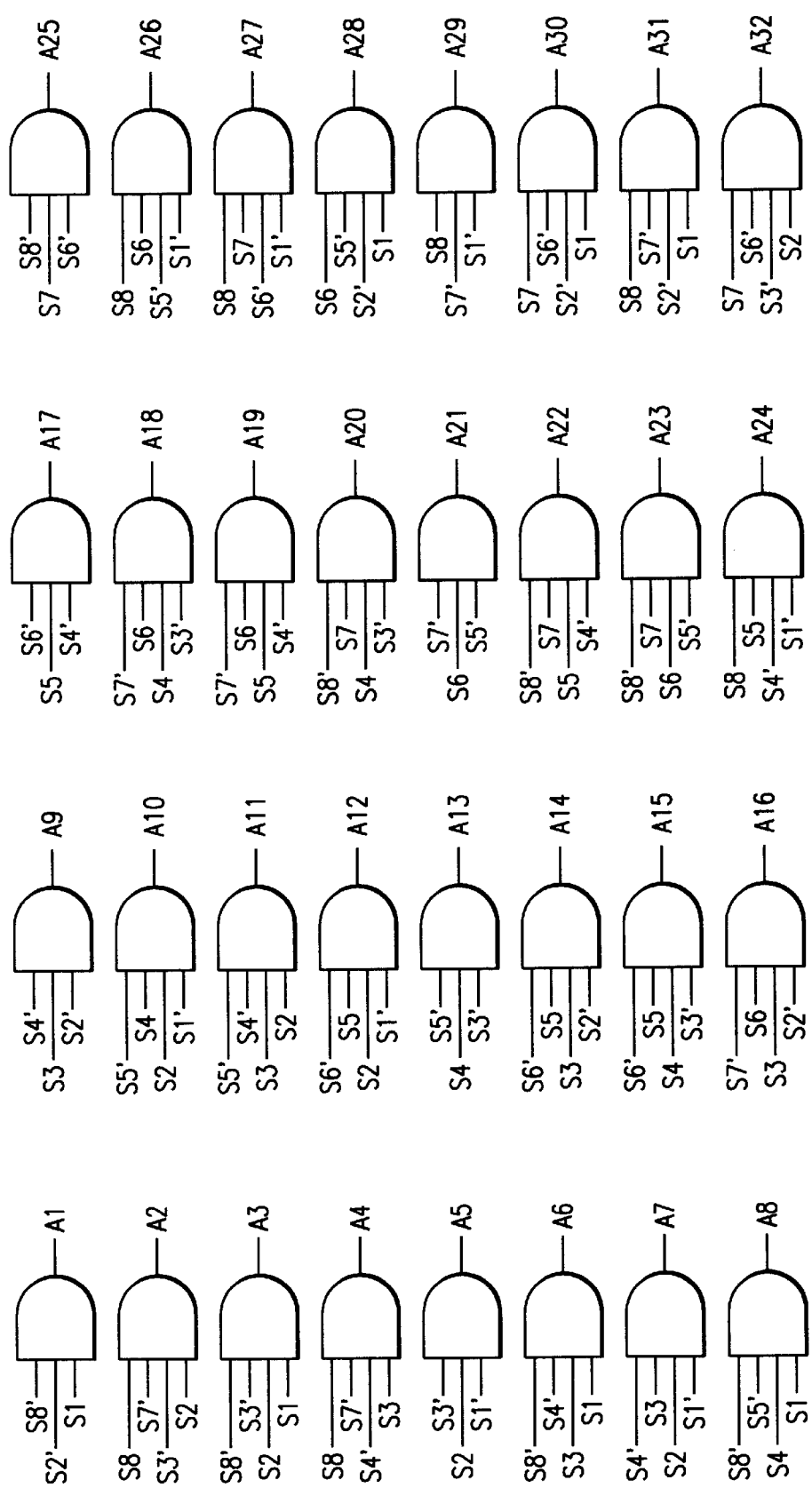
Figure 25:
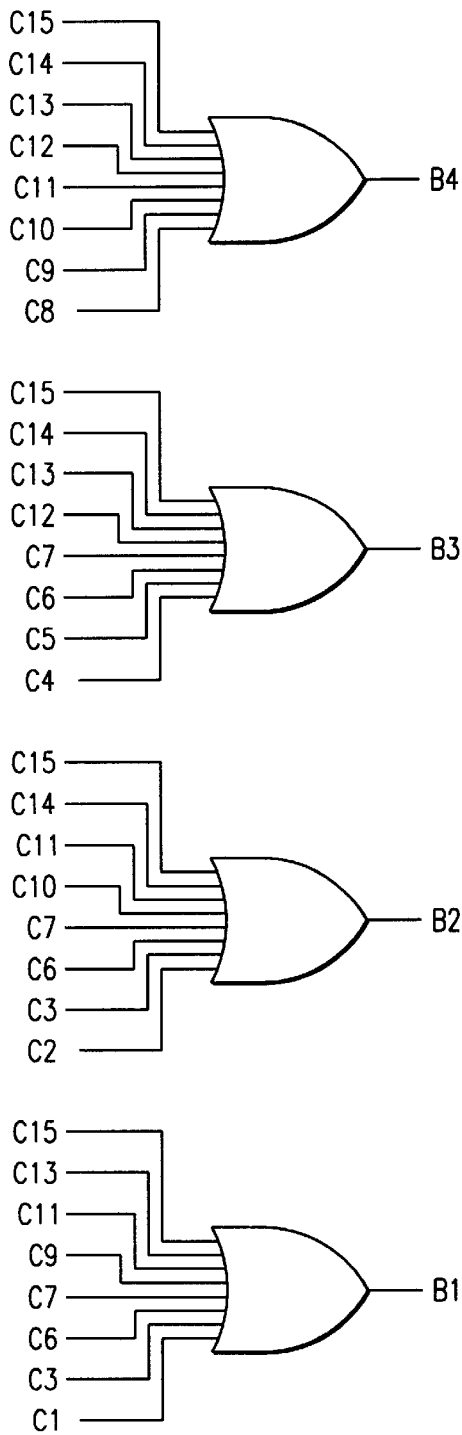

Each of the logic AND functions represented by the Boolean expressions (A1–A32) of FIG. 17 are shown in FIG. 23. Each of the logic OR gates generating functions C1 to C15 on FIG. 21 are shown in FIG. 24. The logic OR gates that generate binary bits B1, B2, B3, and B4 may then be decoded as shown in FIG. 25. Inputs of OR gates as shown in FIG. 25 are derived from the OR gates of FIG. 24.

Figure 26:
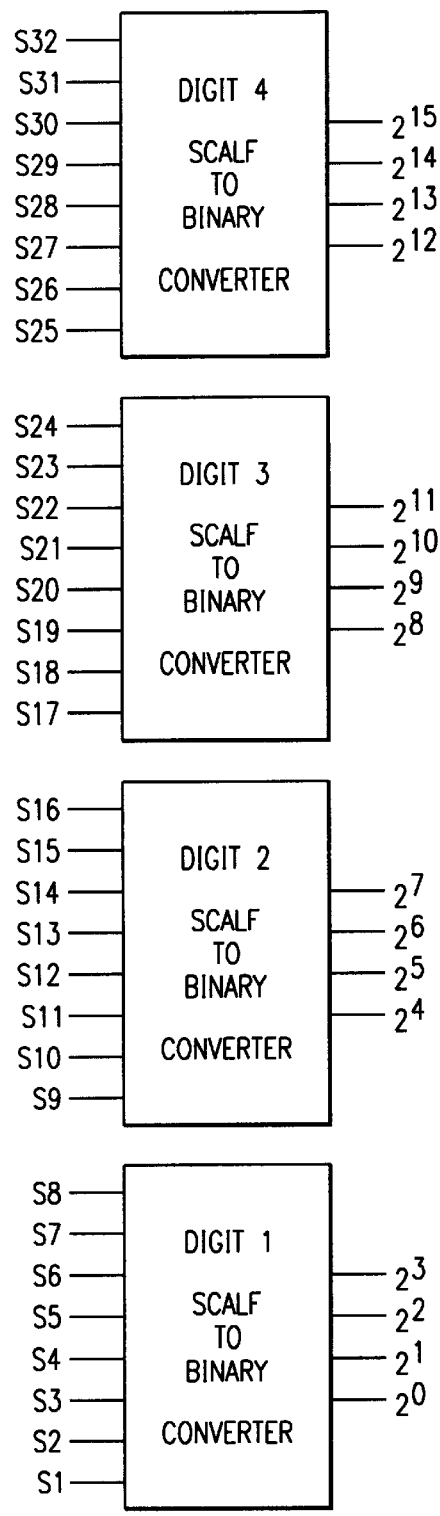
FIG. 26 is a block diagram of an exemplary scaled-up implementation of the decoder illustrated on FIG. 15.

FIGS. 22 through 25 form a complete schematic of the decode function. This circuit may be duplicated for each digit of a multi-digit system. If each higher order digit is multiplied by sixteen, then a four digit decode system may be constructed by duplicating the circuit of FIG. 15 four times as shown in FIG. 26.

It will of course be understood that the logic illustrated in FIGS. 15 through 26 may be accomplished in several different ways. As noted, the illustrated example uses all positive logic gates only. It will be appreciated that the same logic may be accomplished using negative logic (NAND and NOR) or a combination of positive and negative logic. FIG. 15, and FIGS. 22 through 26 may also be drawn in several ways to enable decoding of SCALF code. The exemplary implementation described herein further assumes that the sensor outputs are high true. If the sensors being used are low true, then the same function will work by simply changing the input signal names shown in FIG. 22 to that shown in FIG. 27. Also, if low true sensors are used, the truth table of Table 7 must have each sensor output inverted as shown in Table 8:

TABLE 8

| Binary Code | SCALF code (normal) | SCALF code (abnormal) |
| --- | --- | --- |
| 0000 | 11111110 | 01111100 |
| 0001 | 11111100 | 01111000 |
| 0010 | 11111101 | 11111000 |
| 0011 | 11111001 | 11110000 |
| 0100 | 11111011 | 11110001 |
| 0101 | 11110011 | 11100001 |
| 0110 | 11110111 | 11100011 |
| 0111 | 11100111 | 11000011 |
| 1000 | 11101111 | 11000111 |
| 1001 | 11001111 | 10000111 |
| 1010 | 11011111 | 10001111 |
| 1011 | 10011111 | 00001111 |
| 1100 | 10111111 | 00011111 |
| 1101 | 00111111 | 00011110 |
| 1110 | 01111111 | 00111110 |
| 1111 | 01111110 | 00111100 |

Although the present invention and its advantages have been described in detail, it should be understood that various changes, substitutions and alterations can be made herein without departing from the spirit and scope of the invention as defined by the appended claims.

I claim:

1. A method for encoding a current state of an array of elements, each element currently in either a high or low condition, the method comprising:
   (a) identifying a set of expected valid normal detected states of the array, the set of expected valid normal detected states excluding a state in which all elements are detected to be in low condition;
   (b) identifying a set of expected valid abnormal detected states for the array, the set of expected valid abnormal detected states also excluding a state in which all elements are detected to be in low condition;
   (c) identifying a set of events to which normal and abnormal detected states of the array are to correspond;
   (d) developing a truth table in which each event in the set thereof corresponds to at least one expected valid normal detected state of the array and at least one expected valid abnormal detected state of the array;
   (e) polling the current state of the array; and
   (f) identifying a current event from the set of events based upon the truth table in view of current state of the array as polled in step (e).

2. The method of claim 1, in which step (f) includes the substep of identifying an error condition if all elements in the array are polled in step (e) to be in a low condition.

3. The method of claim 1, in which step (f) includes identifying an error condition if the current state of the array as polled in step (e) includes a group of at least three contiguous activated elements bounded by first and last elements in a high condition, and if at least one element intervening said first and last elements in the group is in a low condition.

4. The method of claim 3, in which step (f) further comprises correcting for said error condition by setting all elements in the group to a high condition.

5. The method of claim 1, in which step (f) includes the substep of decoding the current state of the array as polled in step (e) to a computer-compatible code.

6. The method of claim 5, in which the computer-compatible code is a code selected from the group consiting of
   (a) binary code;
   (b) binary coded decimal code;
   (c) octal code;
   (d) hexadecimal code; and
   (e) Gray code.

7. The method of claim 5, in which said decoding is accomplished at least in part by software.

8. The method of claim 5, in which said decoding is accomplished at least in part by hardware.

9. The method of claim 8, in which the hardware includes circuitry selected from the group consisting of:
   (a) a logic integrated circuit;
   (b) a programmable gate array (PGA);
   (c) a field programmable gate array (FPGA);
   (d) a programmable logic device (PLD);
   (e) an erasable programmable logic device (EPLD); and
   (f) an application specific integrated circuit (ASIC).

10. The method of claim 1, in which a reference datum may be arbitrarily selected in the array to separate any two elements in the array to be designated first and last elements in the array.

11. A method for encoding a current state of an array of elements, each element currently in either a high or low condition, the method comprising:
(a) identifying a set of expected valid normal detected states of the array;
(b) identifying a set of expected valid abnormal detected states for the array;
(c) identifying a set of events to which normal and abnormal detected states of the array are to correspond;
(d) developing a truth table in which each event in the set thereof corresponds to at least one expected valid normal detected state of the array and at least one expected valid abnormal detected state of the array;
(e) polling the current state of the array; and
(f) identifying a current event from the set of events based upon the truth table in view of current state of the array as polled in step (e).

12. The method of claim 11, in which both the set of expected valid normal detected states and the set of expected valid abnormal detected states exclude a state in which all elements are detected in step (e) to be in low condition.

13. The method of claim 11, in which step (f) includes identifying an error condition if the current state of the array as polled in step (e) includes a group of at least three contiguous activated elements bounded by first and last elements in a high condition, and if at least one element intervening said first and last elements in the group is in a low condition.

14. The method of claim 13, in which step (f) further comprises correcting for said error condition by setting all elements in the group to a high condition.

15. The method of claim 12, in which step (f) includes the substep of identifying an error condition if all elements in the array are polled in step (e) to be in a low condition.

16. The method of claim 11, in which step (f) includes the substep of decoding the current state of the array as polled in step (e) to computer-compatible code.

17. The method of claim 16, in which the computer-compatible code is a code selected from the group consiting of
(a) binary code;
(b) binary coded decimal code;
(c) octal code;
(d) hexadecimal code; and
(e) Gray code.

18. The method of claim 16, in which said decoding is accomplished at least in part by software.

19. The method of claim 16, in which said decoding is accomplished at least in part by hardware.

20. The method of claim 19, in which the hardware includes circuitry selected from the group consisting of:
(1) a logic integrated circuit;
(2) a programmable gate array (PGA);
(3) a field programmable gate array (FPGA);
(4) a programmable logic device (PLD);
(5) an erasable programmable logic device (EPLD); and
(6) an application specific integrated circuit (ASIC).

21. The method of claim 11, in which a reference datum may be arbitrarily selected in the array to separate any two elements in the array to be designated first and last elements in the array.

22. A method for encoding a positional state of a hierarchical gear assembly, the gear assembly comprising a plurality of interrelated rotary gears, one complete revolution of a lower gear causing a predetermined amount of rotation less than one revolution in an immediately higher gear, the method comprising:
(a) deploying at least one source on each rotary gear;
(b) deploying a sensor array for each rotary gear, each array comprising at least three sensors in sensory communication with the sources on its corresponding rotary gear;
(c) identifying a set of expected valid normal detected states for each array;
(d) identifying a set of expected valid abnormal detected states for each array;
(e) identifying a set of positional states of the hierarchical gear assembly to which combinations of normal and abnormal detected states in each array are to correspond;
(f) developing a truth table in which each positional state of the hierarchical gear assembly in the set thereof corresponds to a combination of at least one expected valid normal detected state of each array and at least one expected valid abnormal detected state of each array;
(g) polling the current state of each array; and
(h) identifying a current positional state for the hierarchical gear assembly from the truth table based upon the combined current states of the arrays as polled in step (g).

23. The method of claim 22, in which all sensors are detectable to be either a high or low condition, and in which both the set of expected valid normal detected states and the set of expected valid abnormal detected states exclude a state in which all sensors on one rotary gear are detected in step (g) to be in a low condition.

24. The method of claim 23, in which step (h) includes the substep of identifying an error condition if all sensors on one rotary gear are detected in step (g) to be in a low condition.

25. The method of claim 22, in which all sensors are detectable to be in either a high or low condition, and in which step (h) includes the substep of identifying an error condition if (1) the current state of at least one array as polled in step (g) includes a group of at least three contiguous activated sensors bounded by first and last sensors in a high condition, and (2) at least one sensor intervening said first and last sensor in the group is in a low condition.

26. The method of claim 25, in which step (h) further includes the substep of correcting for said error condition by setting all sensors in the group to a high condition.

27. The method of claim 22, in which a reference datum may be arbitrarily and independently selected in each array to separate any two elements in each array to be designated first and last elements in said array.

28. The method of claim 22, in which step (b) includes the substep of deploying sensors at a predesigned radii on each rotary gear so as to create predesigned physical sensor coverage by each source.

29. The method of claim 22, in which step (h) includes the substep of decoding the current positional state of the hierarchical gear assembly to computer-compatible code.

30. The method of claim 29, in which the computer-compatible code is a code selected from the group consiting of
(a) binary code;
(b) binary coded decimal code;
(c) octal code;
(d) hexadecimal code; and (e) Gray code.

31. The method of claim 29, in which said decoding is accomplished at least in part by software.

32. The method of claim 29, in which said decoding is accomplished at least in part by hardware.

33. The method of claim 32, in which the hardware includes circuitry selected from the group consisting of:

(1) a logic integrated circuit;

(2) a programmable gate array (PGA);

(3) a field programmable gate array (FPGA);

(4) a programmable logic device (PLD);

(5) an erasable programmable logic device (EPLD); and (6) an application specific integrated circuit (ASIC).

34. The method of claim 29, in which said decoding substep includes correcting for at least one error selected from the group consisting of:

(1) rotary gear linkage backlash; and (2) rotary gear linkage hysteresis.

* * * * *